(12) United States Patent
Wang et al.

(10) Patent No.: US 11,770,865 B2
(45) Date of Patent: *Sep. 26, 2023

(54) RELAY COMMUNICATION METHOD AND RELAY COMMUNICATIONS APPARATUS AND SYSTEM

(71) Applicant: HUAWEI TECHNOLOGIES CO., LTD., Guangdong (CN)

(72) Inventors: Jing Wang, Shenzhen (CN); Xiao Xiao, Shenzhen (CN); Bo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/555,066

(22) Filed: Dec. 17, 2021

(65) Prior Publication Data

US 2022/0225437 A1 Jul. 14, 2022

Related U.S. Application Data

(63) Continuation of application No. 16/584,154, filed on Sep. 26, 2019, now Pat. No. 11,229,067, which is a continuation of application No. PCT/CN2017/079116, filed on Mar. 31, 2017.

(51) Int. Cl.
*H04W 4/00* (2018.01)
*H04W 76/10* (2018.01)
*H04W 88/04* (2009.01)

(52) U.S. Cl.
CPC ............ *H04W 76/10* (2018.02); *H04W 88/04* (2013.01)

(58) Field of Classification Search
CPC .................................................... H04W 76/10

USPC ......................................................... 370/329
See application file for complete search history.

(56) References Cited

U.S. PATENT DOCUMENTS

| 2013/0016649 | A1 | 1/2013 | Damnjanovic et al. |
| 2017/0303287 | A1 | 10/2017 | Yu et al. |
| 2018/0146504 | A1 | 5/2018 | Xiao et al. |
| 2018/0234524 | A1 | 8/2018 | Cheng et al. |
| 2019/0239132 | A1 | 8/2019 | Wallentin et al. |

(Continued)

FOREIGN PATENT DOCUMENTS

| CN | 102026411 | 4/2011 |
| CN | 102724666 | 10/2012 |

(Continued)

OTHER PUBLICATIONS

Extended European Search Report dated Nov. 28, 2019, issued in counterpart EP Application No. 17903348.5, 13 pages.

(Continued)

*Primary Examiner* — Temica M Beamer
(74) *Attorney, Agent, or Firm* — Fish & Richardson P.C.

(57) ABSTRACT

A relay communication method and a relay communications apparatus and system for receiving, by a relay terminal, a first message sent by an access network device, where the first message includes configuration information of a first bearer; and configuring, by the relay terminal, an adaptation layer logical entity for the first bearer based on the first message, where the first bearer is a bearer between the relay terminal and the access network device, and the adaptation layer logical entity is used to distinguish between data of the relay terminal and data of a remote terminal or between data of different remote terminals.

20 Claims, 16 Drawing Sheets

(56) References Cited

U.S. PATENT DOCUMENTS

| | | | |
|---|---|---|---|
| 2020/0077253 A1 | 3/2020 | Kim et al. |
| 2020/0100088 A1 | 3/2020 | Kim et al. |
| 2020/0120728 A1 | 4/2020 | Wallentin et al. |

FOREIGN PATENT DOCUMENTS

| | | |
|---|---|---|
| CN | 104869666 | 8/2015 |
| CN | 105657838 | 6/2016 |
| CN | 105657865 | 6/2016 |
| EP | 2723143 | 4/2014 |
| WO | 2016161915 | 10/2016 |
| WO | 2016184342 | 11/2016 |
| WO | 2017014716 | 1/2017 |

OTHER PUBLICATIONS

Huawei et al., "Feasibility of Bluetooth for UE relay," 3GPP TSG RAN WG2 Meeting #94, R2-163601, Nanjing, China, May 2016, 3 pages.

Huawei et al., "General technical consideration on PCS enhancement for Technical Fields UE-To-NW relay," 3GPP TSG-RAN WG2 Meeting #93bis, R2-162641, Dubrovnik, Croatia. Apr. 2016, 4 pages.

Huawei et al., "RRC Connection establishment and bearer setup via L2 Relay," 3GPP TSG-RAN WG2 #97bis, R2-17034466, Spokane, Washington, USA, Apr. 3-7, 2017, 6 pages.

Nokia, "Discussion on adaptation layer for FeD2D," 3GPP TSG-RAN WG2 Meeting #96, R2-168399, Reno, USA, Nov. 14-18, 2016, 3 pages.

Office Action dated Dec. 7, 2020, issued in Counterpart Japanese Application No. 2019-553259, 18 pages (with English translation).

Office Action dated Jun. 22, 2021, issued in counterpart Korean Application No. 2019-7032340, 7 pages (with English translation).

Oppo, "Discussion on the Scenario and Scope for FeD2D," 3GPP TSG-RAN2 Meeting #93bis, R2-162195, Dubrovnik, Croatia, Apr. 2016, 6 pages.

PCT International Search Report dated Sep. 1, 2017, issued in counterpart International Application No. PCT/CN2017/079116, 14 pages.

RELAY COMMUNICATION METHOD AND RELAY COMMUNICATIONS APPARATUS AND SYSTEM

CROSS-REFERENCE TO RELATED APPLICATIONS

This application is a continuation of U.S. patent application Ser. No. 16/584,154, filed on Sep. 26, 2019, which is a continuation of International Application No. PCT/CN2017/079116, filed on Mar. 31, 2017. The disclosures of the aforementioned applications are hereby incorporated by reference in their entireties.

TECHNICAL FIELD

The present invention relates to the field of communications technologies, and in particular, to a relay communication method and a relay communications apparatus and system.

BACKGROUND

With the emergence and update of a smartwatch, a smart band, and smart glasses, a wearable device has become increasingly popular. An application based on the wearable device and a communications technology for the wearable device have also become research hotspots in a global communications industry.

In a typical application scenario of the wearable device, the wearable device generally sets up a wireless connection to a cellular network (for example, a long term evolution (LTE) network) through forwarding performed by a relay terminal (for example, a smartphone), and communicates with the cellular network. In this way, a user can directly transmit data of various services to the network by using various applications (APP) on the wearable device. A communication manner in which the wearable device performs relay transmission by using the relay terminal is also referred to as user equipment (UE)-to-network relay transmission.

To implement a relay function of the relay terminal, a layer 2 relay function is added to a communications protocol stack architecture of the relay terminal. The layer 2 relay function is located above a radio link control (RLC) layer (where the RLC layer is not included) and below an internet protocol (IP) layer or a radio resource control (RRC) layer (where neither the IP layer nor the RRC layer is included). Current communications protocol stack architectures of a terminal and an access network device do not include the relay function. Therefore, the access network device cannot configure the relay function of the relay terminal. As a result, the access network device does not support in configuring a relay bearer of the relay terminal using the relay function.

SUMMARY

To resolve the problem that the prior art does not support in configuring a relay bearer of a relay terminal using a relay function, embodiments of the present invention provide a relay communication method and a relay communications apparatus and system.

According to a first aspect, an embodiment of the present invention provides a relay communication method. The method includes: receiving, by a relay terminal, a first message sent by an access network device, where the first message includes configuration information of a first bearer; and configuring, by the relay terminal, an adaptation layer logical entity for the first bearer based on the first message, where the first bearer is a bearer between the relay terminal and the access network device, and the adaptation layer logical entity is used to distinguish between data of the relay terminal and data of a remote terminal or between data of different remote terminals.

In a possible implementation, the configuration information of the first bearer includes a first bearer identifier and adaptation function configuration information. The adaptation function configuration information includes an identifier of the remote terminal and/or a bearer identifier of the remote terminal.

Further, the configuring, by the relay terminal, an adaptation layer logical entity for the first bearer based on the first message may include the following cases.

In a first case, the relay terminal has not set up the first bearer, and the relay terminal newly sets up the first bearer based on the first message. In this case, if existing bearers of the relay terminal do not include the first bearer, the relay terminal sets up the first bearer, and sets up the adaptation layer logical entity for the first bearer based on the adaptation function configuration information.

In a second case, the relay terminal has set up the first bearer, and the relay terminal configures the adaptation layer logical entity of the first bearer based on the adaptation function configuration information. Herein, the configuration may include setting up the adaptation layer logical entity for the first bearer, or reconfiguring the adaptation layer logical entity of the first bearer, or releasing the adaptation layer logical entity of the first bearer.

In another possible implementation, the configuration information of the first bearer includes a first bearer identifier and bearer release indication information. The configuring, by the relay terminal, an adaptation layer logical entity for the first bearer based on the first message means that the relay terminal has set up the first bearer, and the relay terminal releases the first bearer based on the first message. Specifically, releasing the first bearer includes releasing a resource of the first bearer. The resource of the first bearer includes the adaptation layer logical entity.

In still another possible implementation, the configuration information of the first bearer includes a first bearer identifier and a bearer type. The bearer type is a relay bearer or a common bearer. The relay bearer is used to transmit the data of the remote terminal or is used to transmit the data of the remote terminal and the data of the relay terminal, and the common bearer is used to transmit the data of the relay terminal.

Further, the configuring, by the relay terminal, an adaptation layer logical entity for the first bearer based on the first message may include the following cases.

In a first case, the relay terminal has not set up the first bearer and the bearer type in the first message is the relay bearer, and the relay terminal newly sets up the first bearer based on the first message. In this case, if existing bearers of the relay terminal do not include the first bearer, the relay terminal sets up the first bearer, and sets up the adaptation layer logical entity for the first bearer.

In a second case, the relay terminal has set up the first bearer, and the relay terminal configures the adaptation layer logical entity for the first bearer based on the bearer type. Specifically, the configuration may include: when the first bearer in the existing bearers is the common bearer, and the bearer type is the relay bearer, setting up the adaptation layer logical entity for the first bearer, thereby changing the common bearer to the relay bearer; or when the first bearer in the existing bearers is the relay bearer, and the bearer type is the common bearer, releasing the adaptation layer logical entity of the first bearer, thereby changing the relay bearer to the common bearer.

According to a second aspect, an embodiment of the present invention provides a relay communication method. The method includes: determining, by an access network device, configuration information of a first bearer, where the first bearer is a bearer between the access network device and a relay terminal; and sending, by the access network device, a first message to the relay terminal, where the first message includes the configuration information of the first bearer, the configuration information of the first bearer is used to instruct the relay terminal to configure an adaptation layer logical entity for the first bearer, and the adaptation layer logical entity is used to distinguish between data of the relay terminal and data of a remote terminal or between data of different remote terminals.

In the first aspect and the second aspect, the access network device instructs, by using the first message, the relay terminal to configure the adaptation layer logical entity for the first bearer, thereby supporting in configuring a relay bearer of the relay terminal using an L2 relay protocol stack. There are a plurality of types of L2 relay protocol stacks. All protocol stacks with a relay function above an RLC layer (where the RLC layer is not included) and below an IP layer or an RRC layer (where neither the IP layer nor the RRC layer is included) belong to the L2 relay protocol stack. Herein, configuring the adaptation layer logical entity for the first bearer includes setting up, modifying, or releasing the adaptation layer logical entity. The adaptation layer logical entity is specifically used to determine whether data is transmitted from/to the remote terminal or the relay terminal, or determine which bearer of the remote terminal the data belongs to, or distinguish between data transmitted from/to different remote terminals.

In the first aspect and the second aspect, the first message may be an RRC connection reconfiguration message, an RRC connection setup message, or another grant message sent by the access network device to the relay terminal.

In the first aspect and the second aspect, the adaptation layer logical entity may be an adaptation protocol entity or an adaptation function of a PDCP entity. When the adaptation layer logical entity is the adaptation protocol entity, the adaptation function configuration information further includes an enabling indication or a disabling indication. The enabling indication is used to instruct the relay terminal to enable the adaptation function of the PDCP entity, and the disabling indication is used to instruct the relay terminal to disable the adaptation function of the PDCP entity.

According to a third aspect, an embodiment of the present invention provides a relay communication method. The method includes: generating a MAC PDU, where the MAC PDU includes a MAC CE, the MAC CE includes an identifier of a remote terminal, and the MAC PDU carries data of a signaling radio bearer SRB0 of the remote terminal; and sending the MAC PDU.

The relay communication method in the third aspect may be performed by an access network device or by the remote terminal. When the method is performed by the access network device, the data of the SRB0 may be an RRC connection setup message. When the method is performed by the remote terminal, the data of the SRB0 may be an RRC connection setup request.

According to a fourth aspect, an embodiment of the present invention provides a relay communication method. The method includes: receiving a MAC PDU, where the MAC PDU includes a medium access control control element MAC CE, the MAC CE includes an identifier of a remote terminal, and the MAC PDU carries data of a signaling radio bearer SRB0 of the remote terminal; obtaining the identifier of the remote terminal from the MAC CE of the MAC PDU; and sending the MAC PDU.

In the third aspect and the fourth aspect, the identifier of the remote terminal is a local identifier of the remote terminal. The local identifier is an identifier used by the access network device and the relay terminal to identify the remote terminal. During implementation, the local identifier may be allocated by the access network device or the relay terminal.

According to a fifth aspect, an embodiment of the present invention provides a relay communications apparatus. The apparatus includes units configured to implement the method described in the first aspect, for example, a receiving unit and a configuration unit.

According to a sixth aspect, an embodiment of the present invention provides a relay communications apparatus. The apparatus includes units configured to implement the method described in the second aspect, for example, a generation unit and a sending unit.

According to a seventh aspect, an embodiment of the present invention provides a relay communications apparatus. The apparatus includes units configured to implement the method described in the third aspect, for example, a generation unit and a sending unit.

According to an eighth aspect, an embodiment of the present invention provides a relay communications apparatus. The apparatus includes units configured to implement the method described in the fourth aspect, for example, a receiving unit, an obtaining unit, and a sending unit.

According to a ninth aspect, an embodiment of the present invention further provides a relay communications apparatus, applied to a relay terminal. The apparatus includes a memory and a processor connected to the memory. The memory is configured to store a software program and a module. When running or executing the software program and the module stored in the memory, the processor may perform the method described in the first aspect or the fourth aspect.

According to a tenth aspect, an embodiment of the present invention further provides a relay communications apparatus, applied to an access network device. The apparatus includes a memory and a processor connected to the memory. The memory is configured to store a software program and a module. When running or executing the software program and the module stored in the memory, the processor may perform the method described in the second aspect or the third aspect.

According to an eleventh aspect, an embodiment of the present invention further provides a computer readable medium, configured to store program code to be executed by a terminal. The program code includes an instruction used to perform the method described in the first aspect or the fourth aspect.

According to a twelfth aspect, an embodiment of the present invention further provides a computer readable medium, configured to store program code to be executed by an access network device. The program code includes an instruction used to perform the method described in the second aspect or the third aspect.

According to a thirteenth aspect, an embodiment of the present invention further provides a communications chip, applied to a mobile communications system device. The communications chip includes a processor, a memory, and a communications interface. The processor, the memory, and the communications interface are coupled by using a bus. The memory is configured to store a program instruction. The processor executes the program instruction stored in the memory, so that the communications system device on which the communications chip is disposed can perform the method provided in any one of the possible implementations of the first aspect, the second aspect, the third aspect, or the fourth aspect.

According to a fourteenth aspect, an embodiment of the present invention further provides a relay communications system. The system includes an access network device, a relay terminal, and a remote terminal. The access network device includes the relay communications apparatus provided in the sixth aspect, and the relay terminal includes the relay communications apparatus provided in the fifth aspect. Alternatively, the access network device includes the relay communications apparatus provided in the ninth aspect, and the relay terminal includes the relay communications apparatus provided in the tenth aspect.

According to a fifteenth aspect, an embodiment of the present invention further provides a relay communications system. The system includes an access network device, a relay terminal, and a remote terminal. The access network device and the remote terminal include the relay communications apparatus provided in the seventh aspect, and the relay terminal includes the relay communications apparatus provided in the eighth aspect.

DESCRIPTION OF EMBODIMENTS

A "module" mentioned in this specification is a program or an instruction that is stored in a memory and that can implement some functions. A "unit" mentioned in this specification is a functional structure obtained through logic-based division. The "unit" may be implemented by hardware only, or implemented by a combination of software and hardware.

Figure 1:
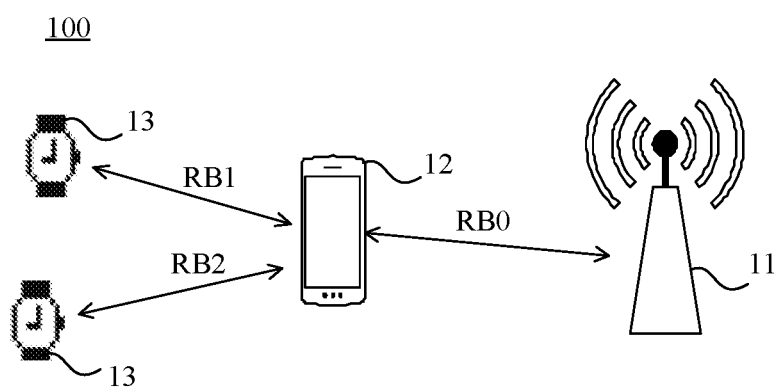
FIG. 1 is a schematic architectural diagram of a relay communications system according to an embodiment of the present invention.

FIG. 1 shows a relay communications system according to an embodiment of the present invention. The relay communications system 100 may be an LTE system, a 5G system, or a subsequent evolved system of the 5G system. As shown in FIG. 1, the relay communications system includes an access network device 11, a relay terminal 12, and a remote terminal 13. The remote terminal 13 communicates with the access network device 11 by using the relay terminal 12.

Further, the relay terminal 12 is connected to the access network device 11 by using a cellular network (including an uplink and a downlink). The remote terminal 13 communicates with the relay terminal 12 through a short-range communication link such as a sidelink, or by using Bluetooth or a wireless local area network WLAN.

In an uplink transmission direction, to be specific, in a direction from the remote terminal 13 to the access network device 11, when the remote terminal 13 needs to send data, the remote terminal 13 first transmits the data to the relay terminal 12 through the sidelink, and then the relay terminal 12 sends the received data to the access network device 11 through the cellular uplink. However, in a downlink transmission direction, to be specific, in a direction from the access network device 11 to the remote terminal 13, the access network device 11 first sends data to the relay terminal 12 through the cellular downlink, and then the relay terminal 12 sends the data to the remote terminal 13 through the sidelink.

In the relay communications system shown in FIG. 1, the relay terminal 12 may be a device such as a smartphone, a personal communications service (PCS) phone, a cordless phone, a session initiation protocol (SIP) phone, a wireless local loop (WLL) station, or a personal digital assistant (PDA). The terminal may also be referred to as a system, a subscriber unit, a subscriber station, a mobile station, a mobile, a remote station, an access point, a remote terminal, an access terminal, a user terminal, a user agent, or user equipment (UE). The remote terminal 13 may be UE, an Internet of things device, or a wearable device such as a smart band, a smartwatch, or smart glasses.

The relay terminal 12 communicates with one or more access network devices 11 by using a radio access network (RAN).

The access network device 11 serves as a router between the relay terminal 12 and a remaining part of the access network. The remaining part of the access network may include an Internet protocol (IP) network. The access network device 11 may further coordinate attribute management of an air interface. For example, the access network device 11 may be a base transceiver station (BTS) in a global system for mobile communications (GSM) or a code division multiple access (CDMA) system, or may be a NodeB in wideband code division multiple access (WCDMA), or may be an eNB in LTE. This is not limited in the present invention.

One relay terminal 12 can provide a relay function for one or more remote terminals 13 (for example, in FIG. 1, one relay terminal 12 provides a relay function for two remote terminals 13). When the relay terminal 12 provides the relay function, one radio bearer RB of the relay terminal 12 may be used to transmit data of an RB of one or more remote terminals 13, and the data of the RB of the one or more remote terminals 13 and data of the relay terminal may be transmitted on a Uu interface (a radio interface between a base station and UE) by using one RB of the relay terminal. When the RB of the relay terminal 12 is used to transmit data of a plurality of RBs of the remote terminals 13, the plurality of RBs respectively belong to different remote terminals. For example, in FIG. 1, an RB1 and an RB2 respectively belong to different remote terminals, but both data of the RB1 and data of the RB2 are transmitted by using a bearer RB0 of the relay terminal.

In the embodiments of the present invention, the RB of the remote terminal is an RB between the access network device and the remote terminal, and the RB is a logical Uu bearer; and the RB of the relay terminal is an RB between the access network device and the relay terminal. In the present invention, RBs of the relay terminal are classified into a common bearer and a relay bearer. The common bearer is an RB that carries only data of the relay terminal. The relay bearer is an RB used to carry data of the remote terminal or an RB that carries both data of the remote terminal and the data of the relay terminal. A signaling flow of setting up the RB of the remote terminal may be similar to a signaling flow of setting up the common bearer of the relay terminal. A message (for example, an RRC connection setup request message, or an RRC connection setup message) used in a process of setting up the RB of the remote terminal may be forwarded by using the relay terminal.

Figure 2A:
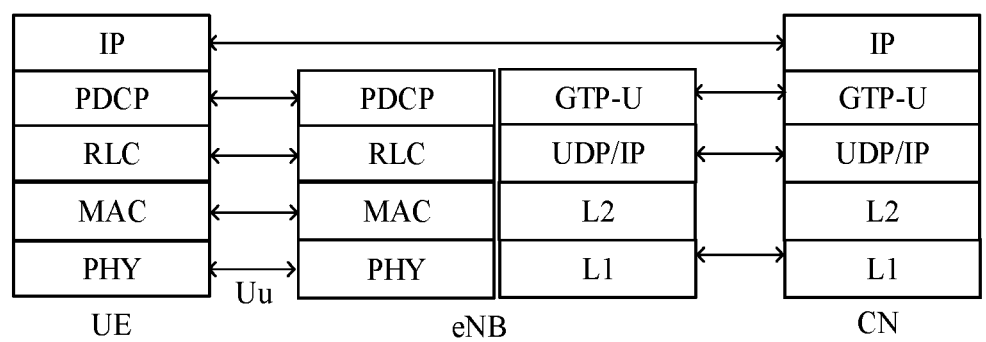
FIG. 2a is a schematic diagram of a wireless protocol stack used when a terminal communicates with an access network device.

FIG. 2a shows a protocol stack used when a relay terminal communicates with an access network device (in other words, when communication is performed based on a common bearer). For the common bearer, processing at a PDCP layer/an RLC layer/a MAC layer/a PHY layer is required. Setting up an RB means setting up a corresponding PDCP/RLC entity for the RB based on a QoS parameter of the RB, setting up a corresponding logical channel at a MAC layer, and configuring the logical channel. Modifying an RB means modifying a configuration of the corresponding PDCP/RLC entity and a configuration of the logical channel. Releasing an RB means releasing the corresponding PDCP/RLC entity and the logical channel.

Figure 2B:
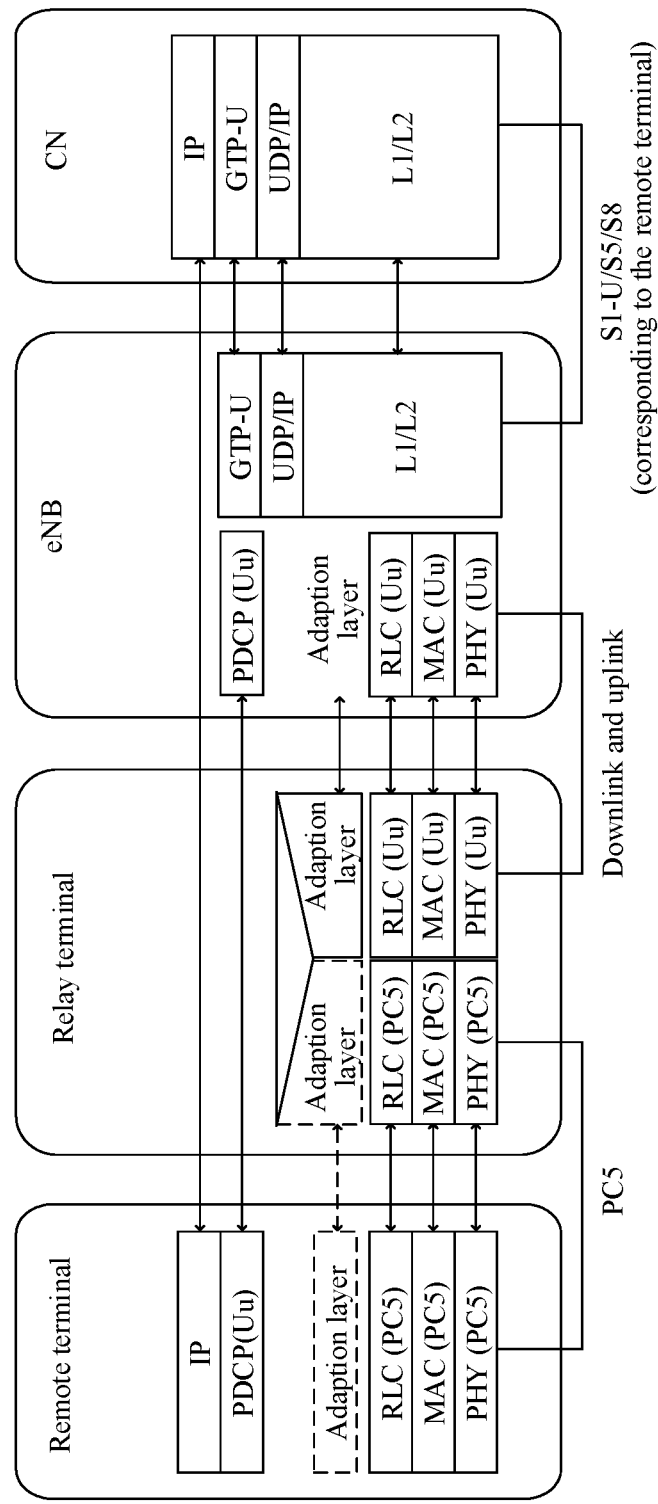
FIG. 2b is a schematic diagram of a wireless protocol stack used when a remote terminal communicates with an access network device by using a relay terminal.

FIG. 2b shows an L2 relay protocol stack used when a remote terminal communicates with an access network device by using a relay terminal (in other words, when communication is performed based on a relay bearer). The L2 relay protocol stack is the same as a UE-to-network relay wireless protocol stack defined in a 3rd generation partnership project (3GPP) standard for communication of a wearable device.

As shown in FIG. 2b, a packet data convergence protocol (PDCP) stack used by the Uu interface (referred to as a Uu PDCP below) exists between the remote terminal and the access network device. The Uu PDCP stack includes several radio bearers (English: Radio Bearer, RB for short) used for data transmission of the remote terminal. In addition, there is an adaptation layer below the Uu PDCP stack of the remote terminal. The adaptation layer has at least one of the following functions: adding a header to the data of the remote terminal, where the header includes an identifier of the remote terminal; adding a radio bearer identifier RBID of the remote terminal to the data; identifying data of the relay terminal and data of the remote terminal; identifying data of different remote terminals; and identifying data of different radio bearers RBs of the remote terminal. The identifier of the remote terminal is used to enable a network side to distinguish between the data of different remote terminals, and then send the data to different core network gateways and servers for subsequent processing.

A PC5 interface wireless protocol stack is below the adaptation protocol layer. The PC5 interface wireless protocol stack includes a radio link control (RLC) layer (PC5), a medium access control protocol (MAC) layer (PC5), and a physical (PHY) layer (PC5). A PC5 interface is an interface used for direct data communication between the remote terminal and the relay terminal, and the PC5 interface is an air interface that is defined in the 3GPP standard and that corresponds to an LTE D2D technology. A sidelink corresponding to the PC5 interface is a "D2D sidelink".

Still referring to FIG. 2b, a packet data convergence protocol (PDCP) stack used by the Uu interface (referred to as a Uu PDCP below) exists between the relay terminal and the access network device. The Uu PDCP stack includes several radio bearers (RB) used for the data transmission of the remote terminal. In addition, there is an adaptation layer below the Uu PDCP stack of the relay terminal. The adaptation layer has a function of relaying the data of the remote terminal. Because the relay terminal also has data to be transmitted, the adaptation layer may be used to distinguish between the data of the relay terminal and the data of the remote terminal or between the data of the different remote terminals. Specifically, an adaptation layer logical entity is used to determine whether the data is transmitted from/to the remote terminal or the relay terminal, and determine which bearer of a specific remote terminal the data belongs to. An RLC (Uu) layer, a MAC (Uu) layer, and a PHY (Uu) layer used by the Uu interface are below the adaptation protocol layer.

Figure 3A:
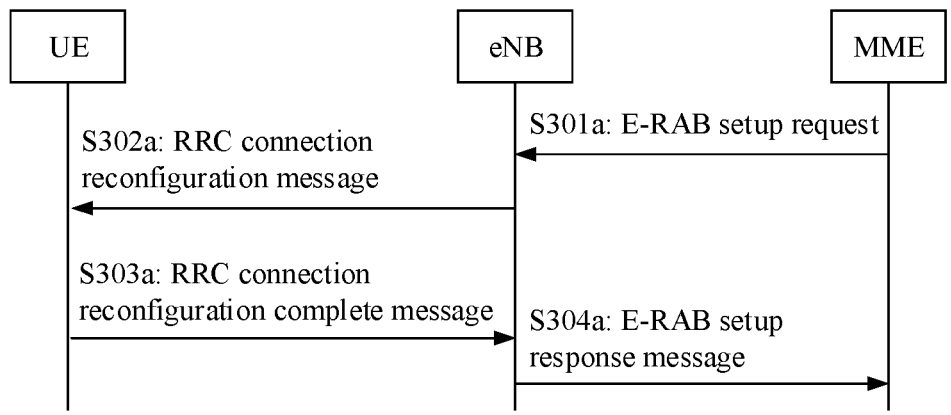
FIG. 3a is a flowchart of an existing process of setting up a bearer between a terminal and an access network device.
Figure 3B:
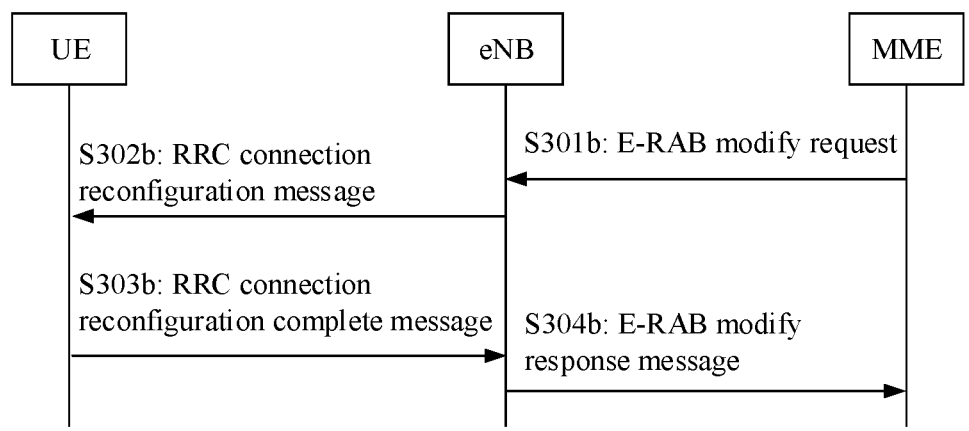
FIG. 3b is a flowchart of an existing process of modifying a bearer between a terminal and an access network device.
Figure 3C:
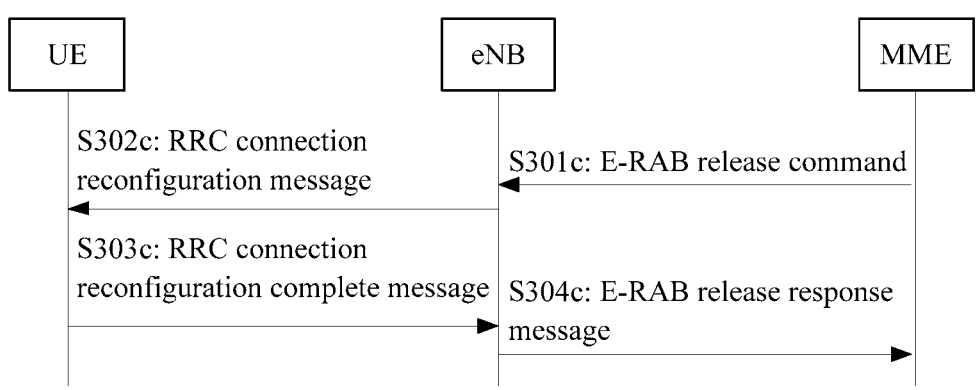
FIG. 3c is a flowchart of an existing process of releasing a bearer between a terminal and an access network device.

FIG. 3a to FIG. 3c respectively show signaling flows of setting up, modifying (which may also be referred to as reconfiguring), and releasing a common bearer. Processes of setting up, modifying, and releasing the common bearer are respectively described below with reference to FIG. 3a to FIG. 3c.

As shown in FIG. 3a, a procedure of setting up a common bearer includes the following steps.

S301a: After a terminal context is set up, a mobility management entity (MME) delivers an evolved radio access bearer (E-RAB) setup request E-RAB SETUP REQUEST to an eNB to trigger setup of the common bearer.

S302a: After receiving the request, the eNB sends an RRC connection reconfiguration message to a terminal, where the RRC reconfiguration message includes a bearer setup modification list (drb-ToAddModList) in a dedicated radio resource configuration RadioResourceConfigDedicated.

Correspondingly, after receiving the RRC connection reconfiguration message, UE sets up a corresponding PDCP entity and configures a corresponding security parameter, sets up an RLC entity and configures the RLC entity, and sets up a logical channel at a MAC layer and configures the logical channel.

S303a: After completing the configuration, the UE sends an RRC connection reconfiguration complete message to the eNB.

S304a: The eNB sends an E-RAB setup response E-RAB Setup Response message to the MME.

As shown in FIG. 3b, a procedure of modifying a common bearer includes the following steps.

S301b: An MME delivers an E-RAB modify request E-RAB MODIFY REQUEST to an eNB to trigger a modification of the common bearer.

S302b: After receiving the request, the eNB sends an RRC connection reconfiguration message to a terminal, where the RRC reconfiguration message includes a bearer setup modification list (drb-ToAddModList) in a dedicated radio resource configuration RadioResourceConfigDedicated.

Correspondingly, after receiving the RRC connection reconfiguration message, UE reconfigures a corresponding PDCP entity, a corresponding RLC entity, and a corresponding logical channel.

S303b: After completing the configuration, the UE sends an RRC connection reconfiguration complete message to the eNB.

S304b: The eNB sends an E-RAB modify response E-RAB Modify Response message to the MME.

As shown in FIG. 3c, a procedure of releasing a common bearer includes the following steps.

S301c: An MME delivers an E-RAB release command E-RAB RELEASE COMMAND to an eNB to trigger release of the common bearer.

S302c: After receiving the request, the eNB sends an RRC connection reconfiguration message to a terminal, where the RRC reconfiguration message includes a bearer release list (drb-ToReleaseList) in a dedicated radio resource configuration RadioResourceConfigDedicated.

Correspondingly, after receiving the RRC connection reconfiguration message, UE releases a corresponding PDCP entity, a corresponding RLC entity, and a corresponding logical channel.

S303c: After completing the configuration, the UE sends an RRC connection reconfiguration complete message to the eNB.

S304c: The eNB sends an E-RAB release response E-RAB RELEASE Response message to the MME.

In addition, the common bearer may be released together with a signaling link.

It can be seen from the related procedures in FIG. 3a to FIG. 3c that configuration of an adaptation layer logical entity is not involved in the processes of setting up, modifying, and releasing the common bearer. Therefore, an existing protocol stack does not support setup, modification, and release of a relay bearer of a relay terminal using an L2 relay protocol stack. Therefore, in the present invention, adaptation function configuration information or a bearer type is added to the RRC connection reconfiguration message (which is described in detail in the following FIG. 6 to FIG. 14), to implement the configuration of the adaptation layer logical entity. The configuration herein includes setup, modification, and release.

The following describes a terminal and an access network device provided in the embodiments of the present invention with reference to specific hardware structures.

Figure 4:
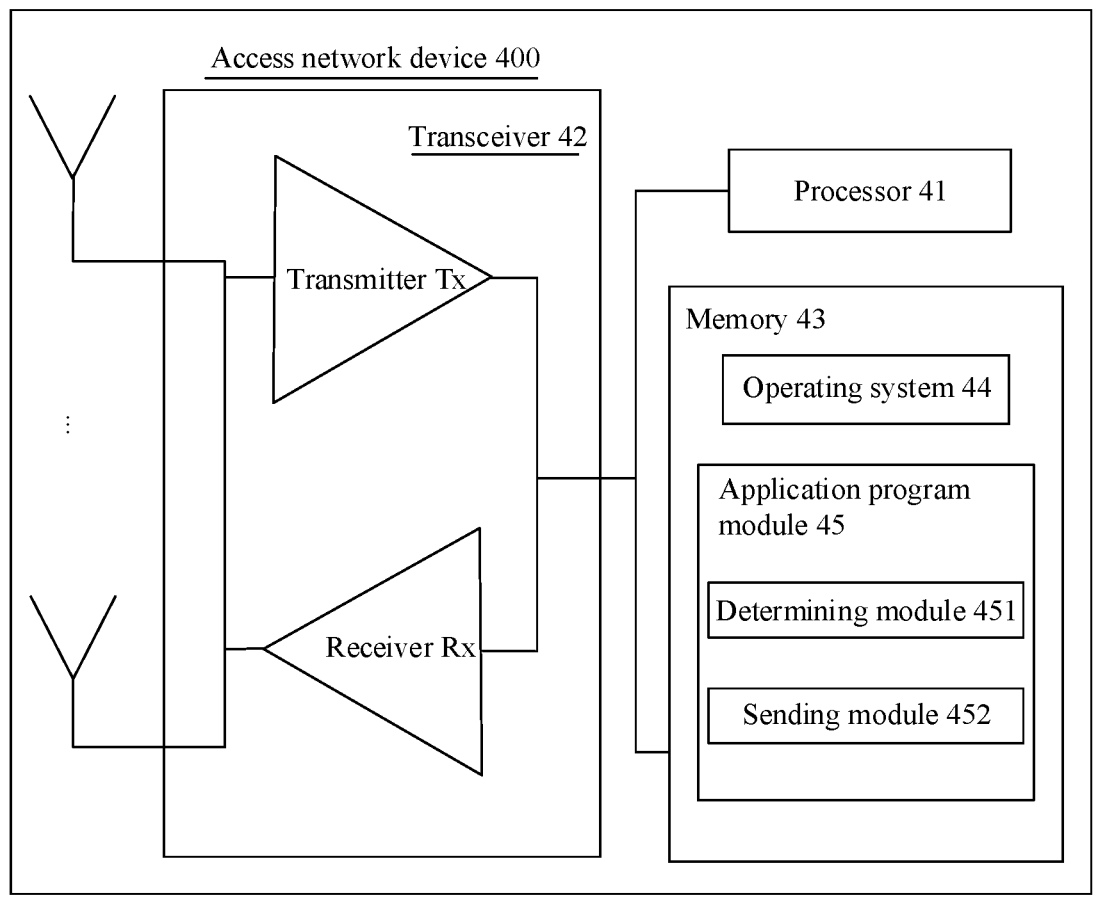
FIG. 4 is a schematic diagram a hardware structure of an access network device according to an embodiment of the present invention.

FIG. 4 shows a hardware structure of an access network device 400 according to an embodiment of the present invention. The access network device 400 may be an eNB. As shown in FIG. 4, the access network device 400 includes a processor 41, a transceiver 42, and a memory 43.

The processor 41 includes one or more processing cores, and the processor 41 executes various function applications and information processing by running a software program and a module.

The transceiver 42 includes a receiver Rx and a transmitter Tx. The transceiver 42 may be alternatively implemented as a communications chip. The communications chip may include a receiving module, a transmission module, a modem module, and the like; and is configured to: modulate/demodulate information, and receive or send the information by using a radio signal.

The transceiver 42, the memory 43, and the processor 41 are coupled by using a bus. The memory 43 may be configured to store a software program and a module. The memory may store an operating system 44 and an application program module 45 of at least one function.

The application program module 45 includes at least a determining module 451 and a sending module 452.

Optionally, the processor 41 is configured to execute modules in the application program module 45, to implement steps in FIG. 6 to FIG. 12 that need to be performed by the access network device.

Alternatively, the application program module 45 includes at least a generation module and a sending module. In this case, the processor 41 is configured to execute the modules in the application program module 45, to implement the steps in FIG. 13a and FIG. 13b that need to be performed by the access network device.

In addition, the memory 43 is a computer readable storage medium, and may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

A person skilled in the art may understand that a structure of the access network device 400 shown in FIG. 4 does not constitute any limitation on the access network device, and the access network device may include components more or fewer than those shown in the figure, a combination of some components, or components disposed differently.

Figure 5:
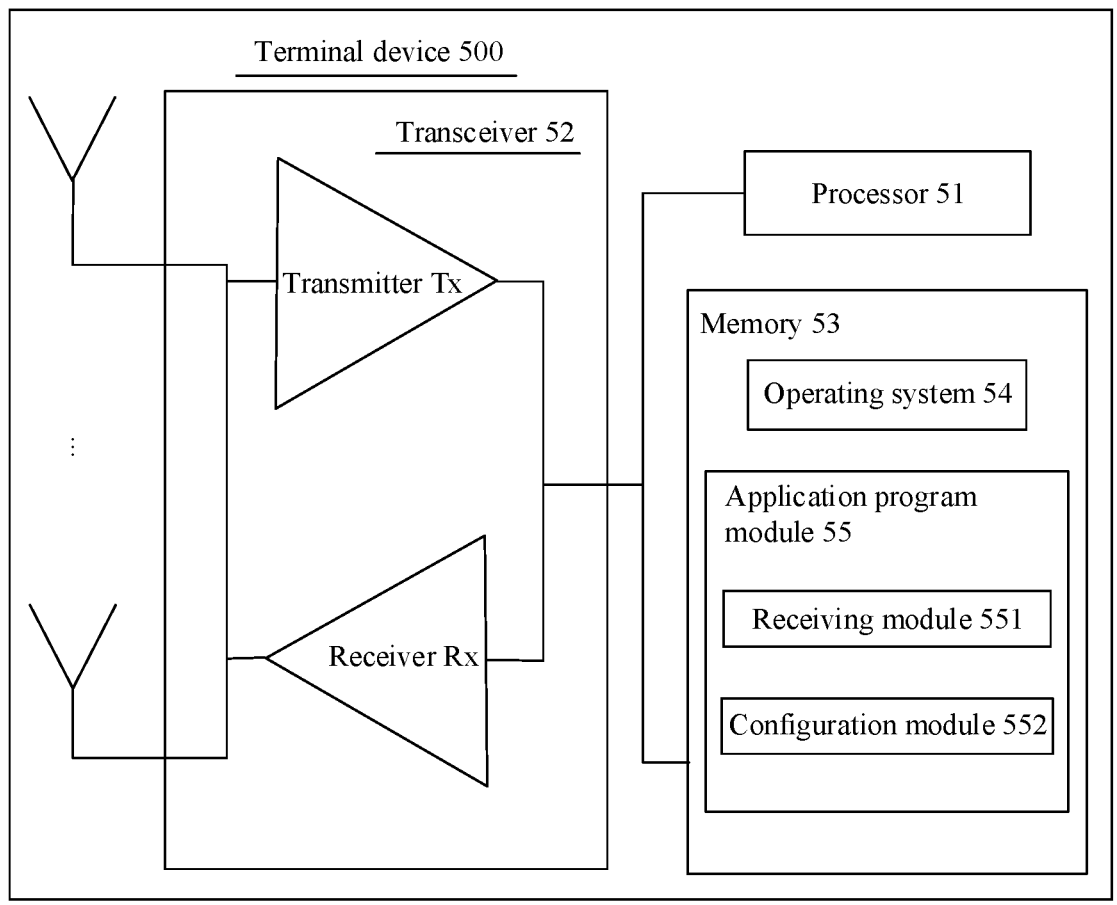
FIG. 5 is a schematic diagram a hardware structure of a terminal according to an embodiment of the present invention.

FIG. 5 shows a hardware structure of a terminal 500 according to an embodiment of the present invention. The terminal 500 may be the relay terminal or the remote terminal described above, and may be specifically a mobile terminal such as a smartphone. As shown in FIG. 5, the terminal 500 includes a processor 51, a transceiver 52, and a memory 53.

The processor 51 includes one or more processing cores, and the processor 51 executes various function applications and information processing by running a software program and a module.

The transceiver 52 includes a receiver Rx and a transmitter Tx. The transceiver 52 may be alternatively implemented as a communications chip. The communications chip may include a receiving module, a transmission module, a modem module, and the like; and is configured to: modulate/demodulate information, and receive or send the information by using a radio signal.

The transceiver 52, the memory 53, and the processor 51 are coupled by using a bus. The memory 53 may be configured to store a software program and a module. The memory may store an operating system 54 and an application program module 55 of at least one function.

The application program module 55 includes at least a receiving module 551 and a configuration module 552.

Optionally, the processor 51 is configured to execute modules in the application program module 55, to implement steps in FIG. 6 to FIG. 12 that need to be performed by the relay terminal.

Alternatively, the application program module 55 includes at least a receiving module, an obtaining module, and a sending module. In this case, the processor 51 is configured to execute the modules in the application program module 55, to implement the steps in FIG. 13a and FIG. 13b that need to be performed by the relay terminal.

Alternatively, the application program module 55 includes at least a generation module and a sending module. In this case, the processor 51 is configured to execute the modules in the application program module 55, to implement the steps in FIG. 13a and FIG. 13b that need to be performed by the remote terminal.

In addition, the memory 53 is a computer readable storage medium, and may be implemented by any type of volatile or non-volatile storage device or a combination thereof, such as an SRAM, an EEPROM, an EPROM, a PROM, a ROM, a magnetic memory, a flash memory, a magnetic disk, or an optical disc.

A person skilled in the art may understand that a structure of the terminal 500 shown in FIG. 5 does not constitute any limitation on the terminal, and the terminal 500 may include components more or fewer than those shown in the figure, a combination of some components, or components disposed differently.

For ease of description, the following uses an example in which an access network device is a base station, a relay terminal is relay user equipment (UE), and a remote terminal is remote user equipment (UE) to describe the embodiments of the present invention in detail.

Figure 6:
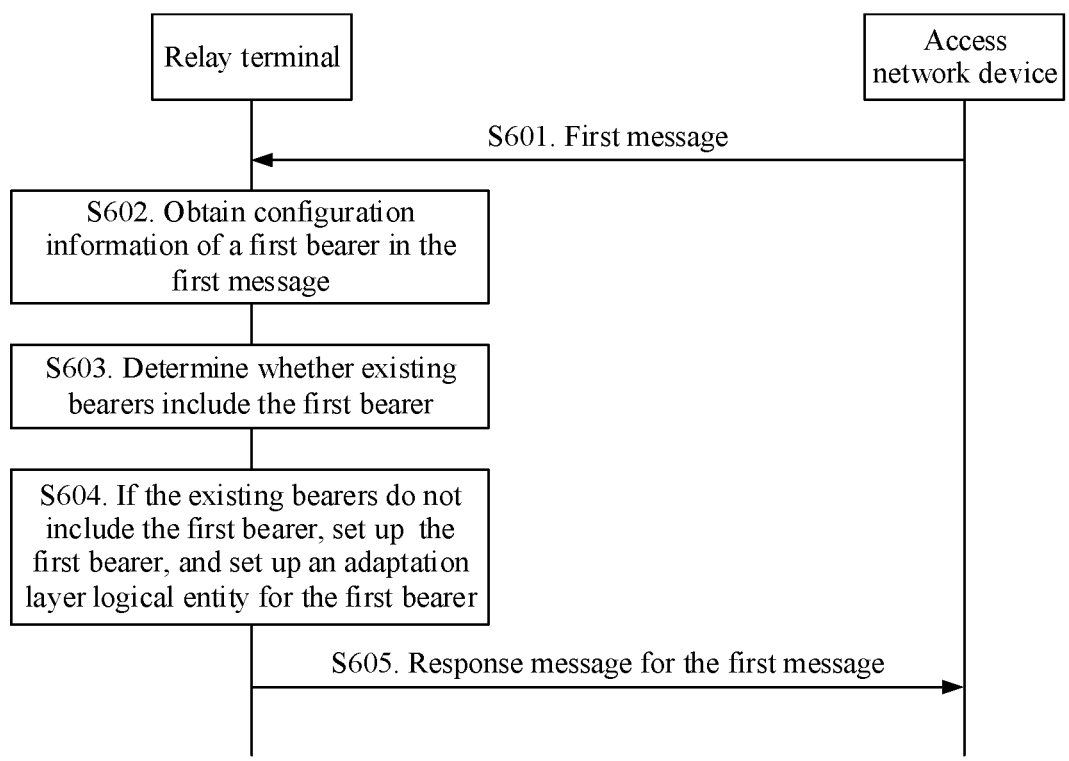
FIG. 6 is a flowchart of a relay communication method according to an embodiment of the present invention.

FIG. 6 is a flowchart of a relay communication method according to an embodiment of the present invention. An example in which a relay terminal newly sets up a relay bearer based on adaptation function configuration information is used to describe the relay communication method in the present invention in detail. As shown in FIG. 6, the method includes the following steps.

S601: A base station sends a first message to the relay terminal.

The first message may be an RRC connection reconfiguration message, and includes configuration information of a first bearer. The configuration information of the first bearer includes a first bearer identifier and the adaptation function configuration information. The first bearer is a bearer between the base station and the relay terminal, namely, the foregoing RB of the relay terminal.

Optionally, the first bearer may be a data radio bearer (DRB), or may be a signaling radio bearer (SRB).

In an actual application, the first message includes a bearer setup modification list, and the first bearer identifier is included in the bearer setup modification list. In an implementation, bearer setup modification lists may be classified into a signaling radio bearer setup modification list srb-ToAddModList and a data radio bearer setup modification list drb-ToAddModList. The signaling radio bearer setup modification list srb-ToAddModList includes a signaling radio bearer identifier. The data radio bearer setup modification list drb-ToAddModList includes a data radio bearer identifier. The first message includes at least one of the two lists. In another implementation, bearer setup modification lists may not be classified into a signaling radio bearer setup modification list and a data radio bearer setup modification list, and one list used in the first message includes both a signaling radio bearer identifier and a data radio bearer identifier. In these two implementations, the first bearer is any bearer that is in the bearer setup modification list and that has the adaptation function configuration information.

Certainly, the bearer setup modification list may further include configuration information of a bearer that does not have adaptation function configuration information. The relay terminal may set up a common bearer based on the configuration information of the bearer that does not have the adaptation function configuration information.

Further, the first bearer identifier may be a specific value, and the value is used to uniquely represent a first bearer.

S602: The relay terminal receives the first message and obtains the configuration information of the first bearer in the first message.

S603: The relay terminal determines whether existing bearers of the relay terminal include the first bearer.

Specifically, the relay terminal determines whether a current configuration of the relay terminal includes the first bearer identifier. If the current configuration of the relay terminal includes the first bearer identifier, it indicates that the existing bearers of the relay terminal include the first bearer. If the current configuration of the relay terminal does not include the first bearer identifier, it indicates that the existing bearers of the relay terminal do not include the first bearer.

S604: If the existing bearers of the relay terminal do not include the first bearer, the relay terminal sets up the first bearer, and sets up an adaptation layer logical entity for the first bearer.

In a possible implementation, the adaptation layer logical entity may be a separate protocol entity, namely, an adaptation protocol entity (referred to as an adaptation layer entity in the present invention). In this implementation, the adaptation function configuration information adaptationConfig is included in the first message as a separate part. Correspondingly, in this implementation, setting up the adaptation layer logical entity for the first bearer includes setting up an adaptation protocol entity based on the adaptation function configuration information. Optionally, the adaptation function configuration information includes at least one of an identifier of a remote terminal and a bearer identifier of the remote terminal. The identifier of the remote terminal may be a local identifier Local ID of the remote terminal. The local identifier is used by a remote base station and the relay terminal to identify the remote terminal, and may be allocated by the base station or the relay terminal. Further, setting up the adaptation protocol entity includes configuring a parameter for the adaptation entity based on the adaptation function configuration information adaptation-Config. The parameter may be a radio bearer identifier of the remote terminal and the identifier of the remote terminal.

In another possible implementation, the adaptation layer logical entity may be a function of a PDCP entity. In this implementation, the adaptation function configuration information is used as an integrated part and included in PDCP configuration information carried in the first message. In this implementation, setting up the adaptation layer logical entity for the bearer corresponding to the first bearer identifier means enabling an adaptation function of the PDCP entity. Correspondingly, in this implementation, setting up the adaptation layer logical entity for the first bearer includes setting up the PDCP entity and enabling the adaptation function of the PDCP entity. Optionally, the adaptation function configuration information may include at least one of the following: the identifier of the remote terminal, the bearer identifier of the remote terminal, indication information used to indicate whether the adaptation function of the PDCP entity is enabled, indication information used to instruct to delete the adaptation layer entity, and indication information used to instruct to set up the adaptation layer entity.

It is easy to learn that after setting up the first bearer, in addition to the adaptation layer logical entity set up for the first bearer, the relay terminal may further set up the PDCP entity, an RLC protocol entity, and a logical channel for the first bearer.

S605: The relay terminal sends a response message for the first message to the base station.

Specifically, when the first message is the RRC connection reconfiguration message, the response message for the first message is an RRC connection reconfiguration complete message.

Figure 7:
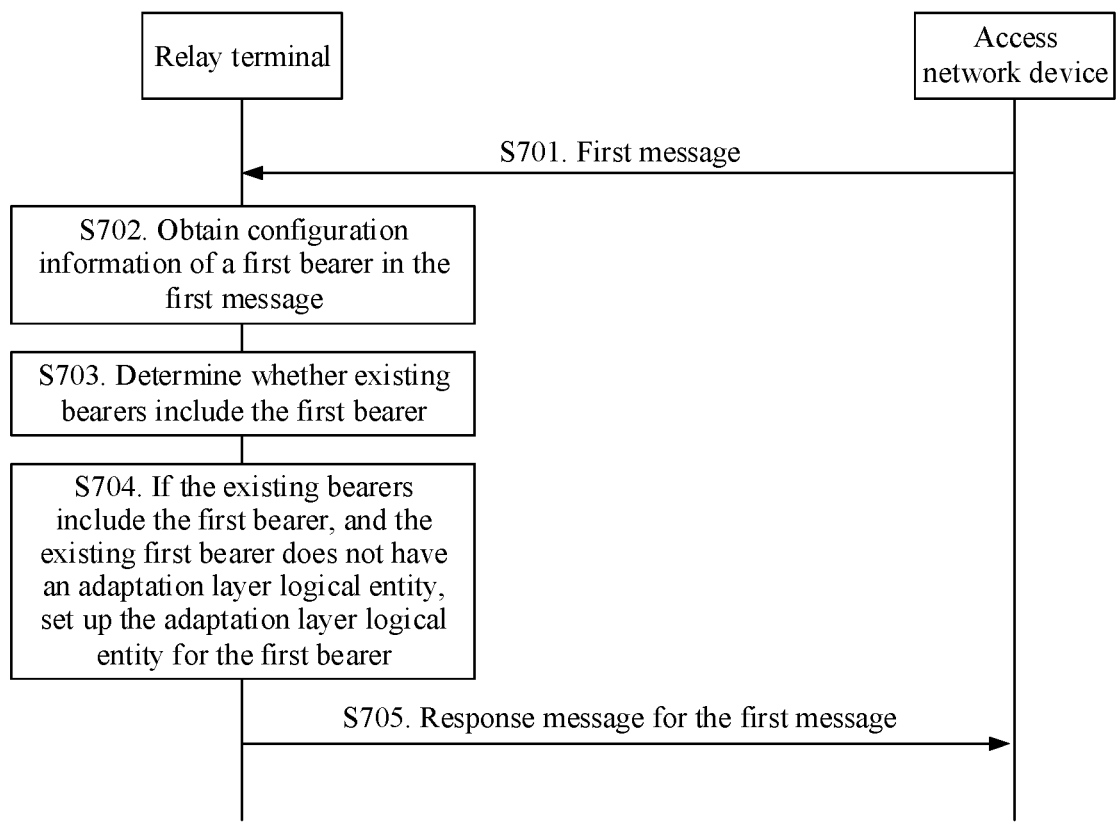
FIG. 7 is a flowchart of another relay communication method according to an embodiment of the present invention.

FIG. 7 is a flowchart of a relay communication method according to an embodiment of the present invention. In the embodiment shown in FIG. 7, an example in which a relay terminal changes a common bearer to a relay bearer based on adaptation function configuration information is used to describe the relay communication method in the present invention in detail. As shown in FIG. 7, the method includes the following steps.

S701: A base station sends a first message to the relay terminal.

For content of the first message, refer to S601. Details are not described herein again.

S702: The relay terminal receives the first message and obtains configuration information of a first bearer in the first message.

S703: The relay terminal determines whether existing bearers of the relay terminal include the first bearer.

An implementation of step S703 is the same as an implementation of step S603, and a detailed description is omitted herein.

S704: If the existing bearers of the relay terminal include the first bearer, and the existing first bearer does not have an adaptation layer logical entity, the relay terminal sets up the adaptation layer logical entity for the first bearer.

Specifically, whether the existing first bearer has the adaptation layer logical entity may be determined in the following manner:

Whether a current configuration of the relay terminal includes the adaptation function configuration information in the first message is determined. If the current configuration of the relay terminal includes the adaptation function configuration information in the first message, it indicates that the existing first bearer of the relay terminal has the adaptation layer logical entity; or if the current configuration of the relay terminal does not include the adaptation function configuration information in the first message, it indicates that the existing first bearer of the relay terminal does not have the adaptation layer logical entity.

Alternatively, whether the existing first bearer has the adaptation layer logical entity may be determined in the following manner:

Whether an adaptation function of a PDCP entity corresponding to the first bearer of the relay terminal is enabled is determined. If the adaptation function is enabled, it indicates that the existing first bearer of the relay terminal has the adaptation layer logical entity; or if the adaptation function is disabled, it indicates that the existing first bearer of the relay terminal does not have the adaptation layer logical entity.

In an implementation of setting up the adaptation layer logical entity for the first bearer, the adaptation function configuration information is used as an integrated part and included in PDCP configuration information carried in the first message. In this implementation, setting up an adaptation layer logical entity for a bearer corresponding to a first bearer identifier means enabling the adaptation function of the PDCP entity. Correspondingly, in this implementation, setting up the adaptation layer logical entity for the first bearer includes enabling the adaptation function of the PDCP entity. Optionally, the adaptation function configuration information may include at least one of the following: an identifier of a remote terminal, a bearer identifier of the remote terminal, indication information used to indicate whether the adaptation function of the PDCP entity is enabled, indication information used to instruct to delete an adaptation layer entity, and indication information used to instruct to set up the adaptation layer entity. In a possible implementation, the adaptation layer logical entity may be a separate protocol entity, namely, the adaptation layer entity. For details, refer to step S604. Details are not described herein again.

For an implementation of content of the adaptation layer logical entity, refer to step S604. Details are not described herein again.

S705: The relay terminal sends a response message for the first message to the base station.

Figure 8:
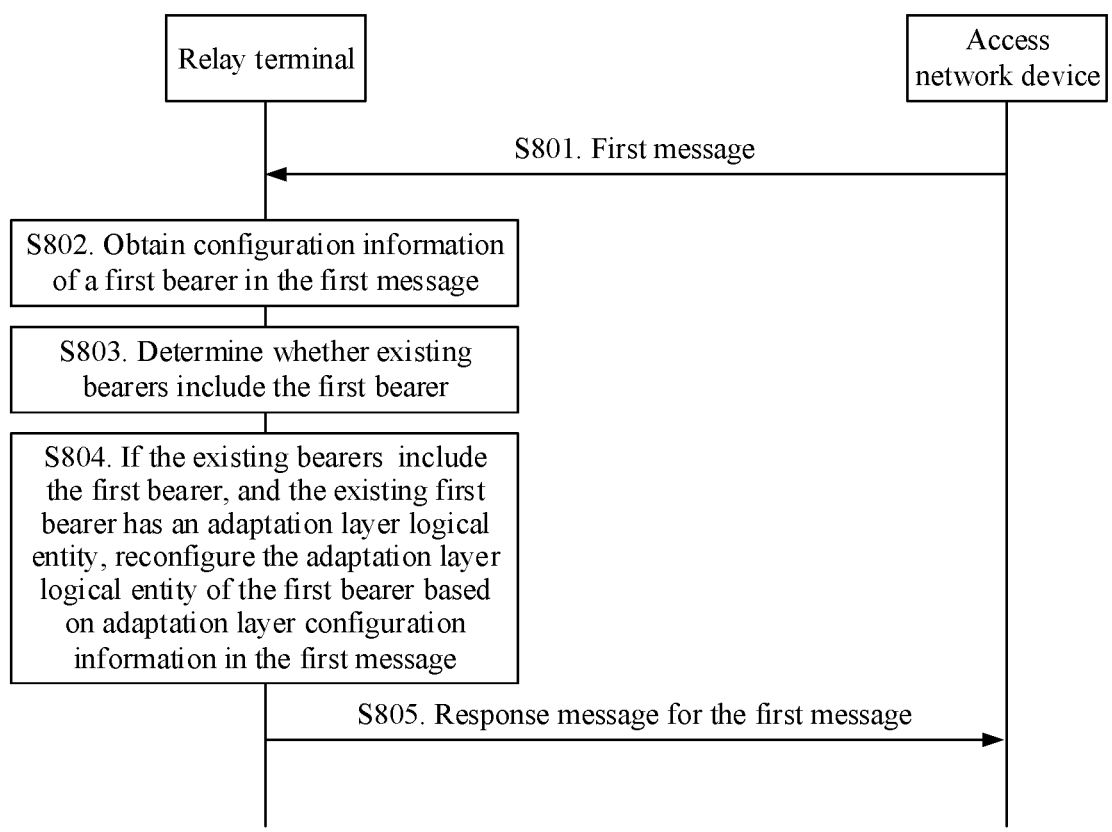
FIG. 8 is a flowchart of still another relay communication method according to an embodiment of the present invention.

FIG. 8 is a flowchart of a relay communication method according to an embodiment of the present invention. In the embodiment shown in FIG. 8, an example in which a relay terminal reconfigures a relay bearer based on adaptation function configuration information is used to describe the relay communication method in the present invention in detail. As shown in FIG. 8, the method includes the following steps.

S801: A base station sends a first message to the relay terminal.

For content of the first message, refer to S601. Details are not described herein again.

S802: The relay terminal receives the first message and obtains configuration information of a first bearer in the first message.

S803: The relay terminal determines whether existing bearers of the relay terminal include the first bearer.

An implementation of step S803 is the same as an implementation of step S603, and a detailed description is omitted herein.

S804: If the existing bearers of the relay terminal include the first bearer, and the existing first bearer includes an adaptation layer logical entity, the relay terminal reconfigures the adaptation layer logical entity of the first bearer based on the adaptation function configuration information in the first message.

For a manner of determining whether the existing first bearer includes the adaptation layer logical entity, refer to step S704. For content of the adaptation layer logical entity, refer to step S604. Therefore, details are not described herein again.

In addition, reconfiguring the adaptation layer logical entity of the first bearer includes at least one of adding a new parameter and modifying an original parameter. The parameter may be at least one of a radio bearer identifier of a remote terminal and an identifier of the remote terminal. For example, a relay bearer of the relay terminal has carried data of the relay bearer and data of an RB of a first remote terminal, and currently, the relay bearer further needs to carry data of an RB of a second remote terminal. In this case, a radio bearer identifier of the second remote terminal and an identifier of the second remote terminal are added to parameters of the adaptation layer logical entity of the first bearer. The first remote terminal and the second remote terminal are two different terminals. For another example, a relay bearer of the relay terminal has carried data of the relay bearer and data of an RB of a first remote terminal, and currently, the relay bearer needs to carry the data of the relay bearer and data of an RB of a second remote terminal instead. In this case, an RB identifier of the first remote terminal and an identifier of the first remote terminal in parameters of the adaptation layer logical entity of the first bearer are replaced with a radio bearer identifier of a second remote terminal and an identifier of the second remote terminal. For another example, a relay bearer of the relay terminal has carried data of the relay bearer, data of an RB of a first remote terminal, and data of an RB of a second remote terminal, and currently, the relay bearer does not carry the data of the RB of the second remote terminal. In this case, a radio bearer identifier of the second remote terminal and an identifier of the second remote terminal are deleted from parameters of the adaptation layer logical entity of the first bearer.

S805: The relay terminal sends a response message for the first message to the base station.

Figure 9:
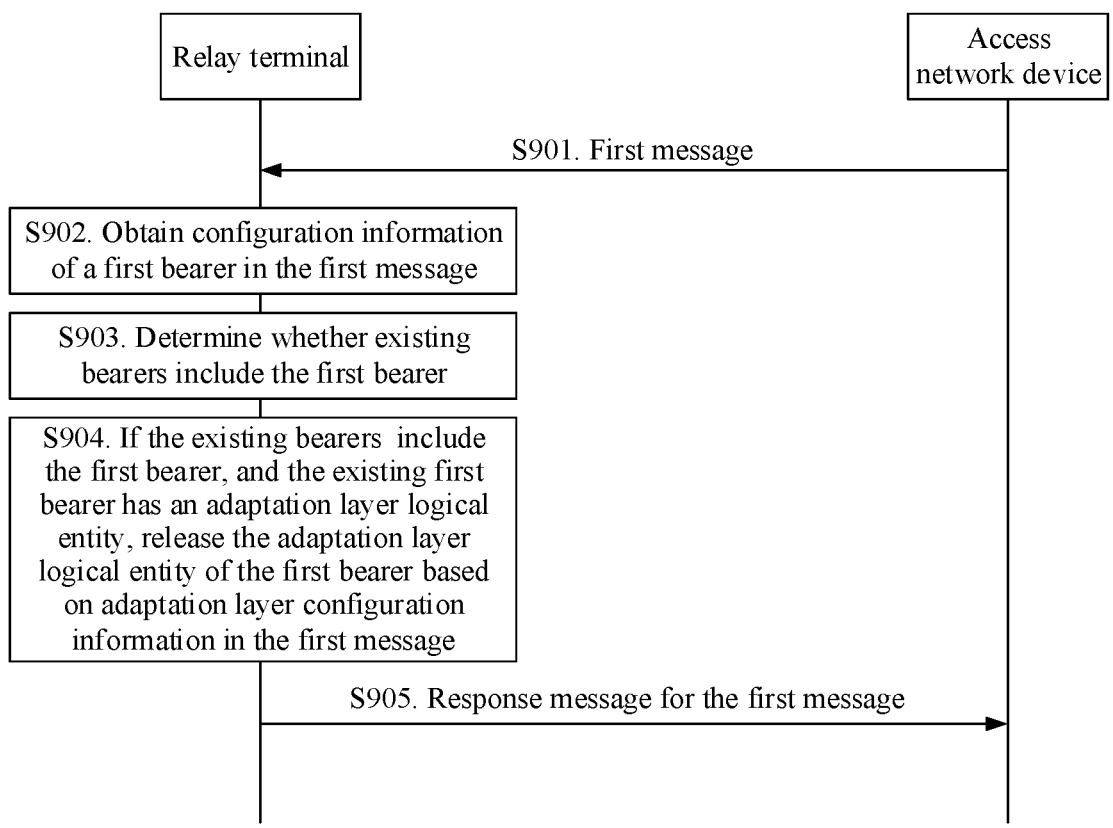
FIG. 9 is a flowchart of still another relay communication method according to an embodiment of the present invention.

FIG. 9 is a flowchart of a relay communication method according to an embodiment of the present invention. In the embodiment shown in FIG. 9, an example in which a relay terminal changes a relay bearer of the relay terminal to a common bearer based on adaptation function configuration information is used to describe the relay communication method in the present invention in detail. As shown in FIG. 9, the method includes the following steps.

S901: A base station sends a first message to the relay terminal.

For content of the first message, refer to S601. Details are not described herein again.

S902: The relay terminal receives the first message and obtains configuration information of a first bearer in the first message.

S903: The relay terminal determines whether existing bearers of the relay terminal include the first bearer.

An implementation of step S903 is the same as an implementation of step S603, and a detailed description is omitted herein.

S904: If the existing bearers of the relay terminal include the first bearer, and the existing first bearer includes an adaptation layer logical entity, the relay terminal releases the adaptation layer logical entity of the first bearer based on the adaptation function configuration information in the first message.

In a possible implementation, the adaptation layer logical entity may be a separate protocol entity, namely, an adaptation protocol entity (referred to as an adaptation layer entity in the present invention). Correspondingly, in this implementation, if the adaptation function configuration information includes indication information used to instruct the relay terminal to release the adaptation layer entity, the relay terminal releases the adaptation layer logical entity of the first bearer. Releasing the adaptation layer logical entity of the first bearer includes releasing the adaptation layer entity.

In another possible implementation, the adaptation layer logical entity may be a function of a PDCP entity. Correspondingly, in this implementation, if the adaptation function configuration information includes indication information used to indicate that an adaptation function of the PDCP entity is disabled, the relay terminal releases the adaptation layer logical entity of the first bearer. Releasing the adaptation layer logical entity of the first bearer includes disabling the adaptation layer function of the PDCP entity.

S905: The relay terminal sends a response message for the first message to the base station.

Figure 10:
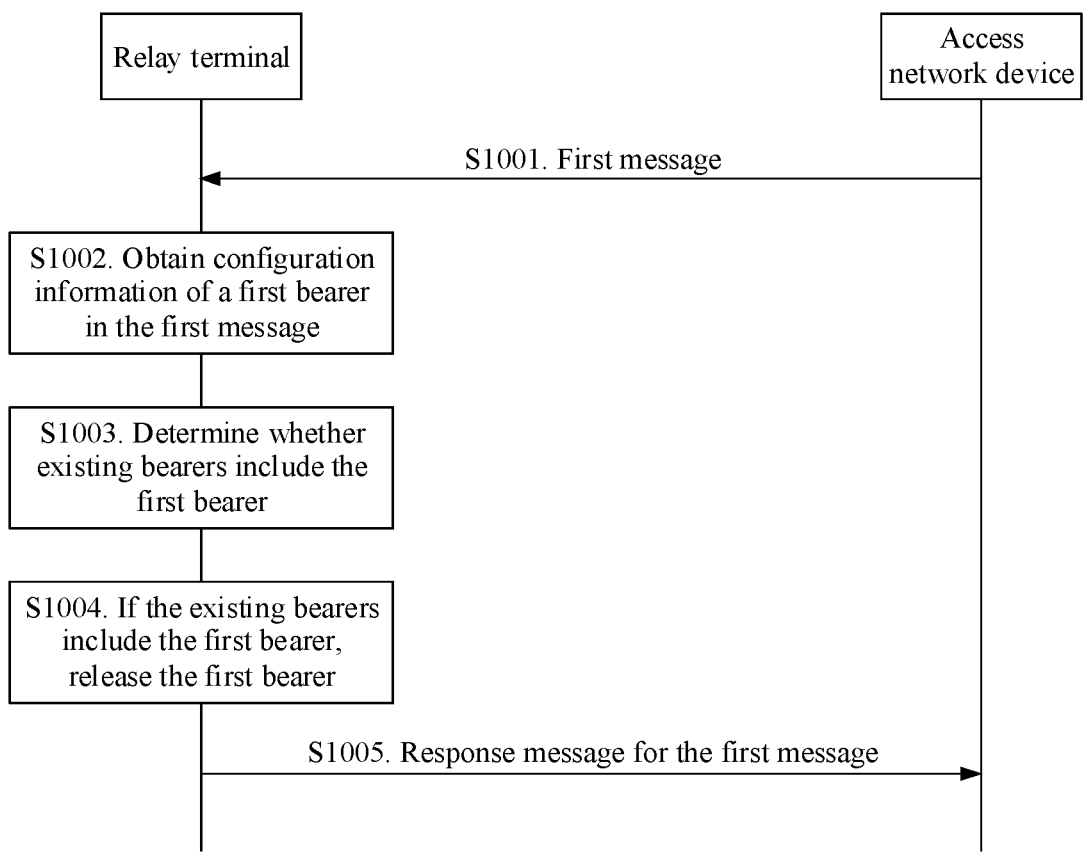
FIG. 10 is a flowchart of still another relay communication method according to an embodiment of the present invention.

FIG. 10 is a flowchart of a relay communication method according to an embodiment of the present invention. In the embodiment shown in FIG. 10, an example in which a relay terminal releases a relay bearer based on configuration information of a first bearer is used to describe the relay communication method in the present invention in detail. As shown in FIG. 10, the method includes the following steps.

S1001: A base station sends a first message to the relay terminal.

The first message may be an RRC connection reconfiguration message, and includes a first bearer identifier and bearer release indication information. The first bearer is a bearer between the base station and the relay terminal, namely, the foregoing RB of the relay terminal. Optionally, the first bearer may be a data radio bearer, or may be a signaling radio bearer.

In an actual application, the first message includes a bearer release list, and the first bearer identifier is included in the bearer release list. In an implementation, bearer release lists may be classified into a signaling radio bearer release list srb-ToReleaseList and a data radio bearer release list drb-ToReleaseList. The signaling radio bearer release list srb-ToReleaseList includes a signaling radio bearer identifier. The data radio bearer release list drb-ToReleaseList includes a data radio bearer identifier. The first message includes at least one of the two lists. In another implementation, bearer release lists may not be classified into a signaling radio bearer release list and a data radio bearer release list, and one list used in the first message includes both a signaling radio bearer identifier and a data radio bearer identifier. In these two implementations, the first bearer is any bearer that is in the bearer release list and that has the adaptation function configuration information. Certainly, the bearer setup modification list may further include a bearer that does not have the adaptation function configuration information.

Further, the first bearer identifier may be a specific value, and the value is used to uniquely represent a first bearer.

S1002: The relay terminal receives the first message and obtains the configuration information of the first bearer in the first message.

S1003: The relay terminal determines whether existing bearers of the relay terminal include the first bearer.

For a specific determining manner, refer to step S603. A detailed description is omitted herein.

S1004: If the existing bearers of the relay terminal include the first bearer, the relay terminal releases a resource corresponding to the first bearer.

The resource corresponding to the first bearer includes an adaptation layer logical entity.

S1005: The relay terminal sends a response message for the first message to the base station.

Figure 11:
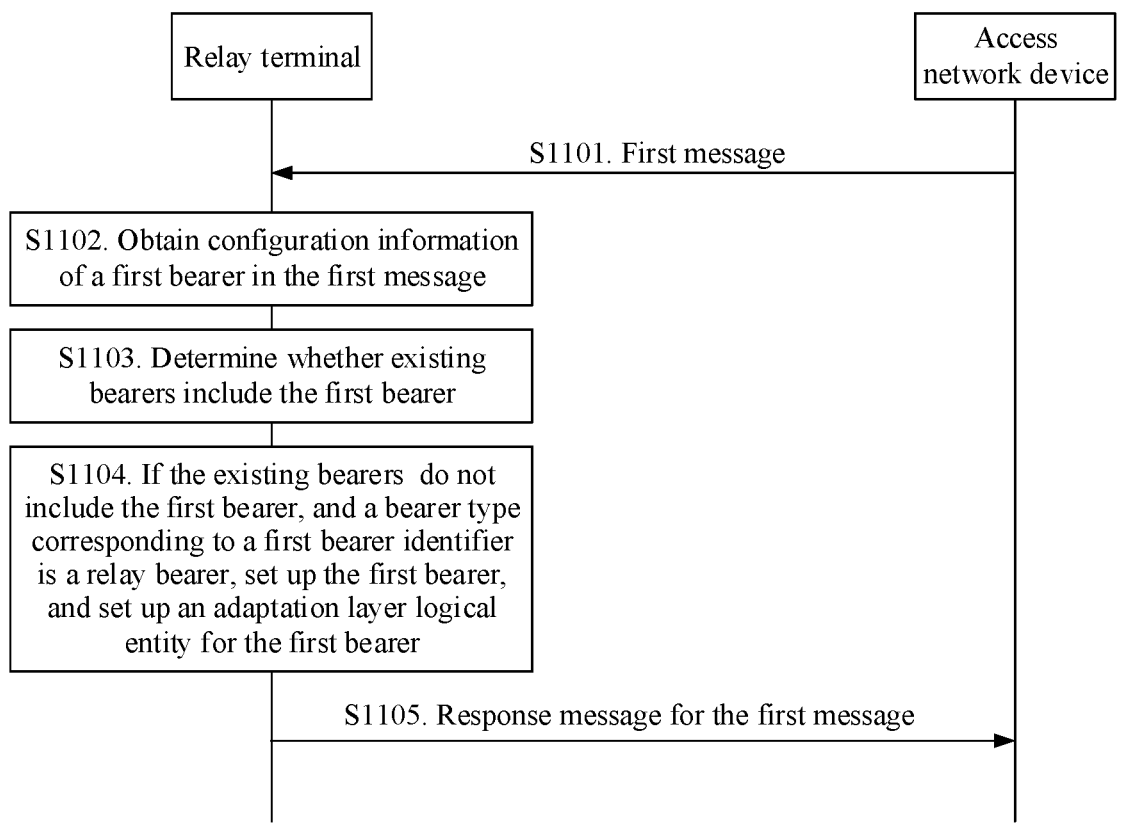
FIG. 11 is a flowchart of still another relay communication method according to an embodiment of the present invention.

FIG. 11 is a flowchart of a relay communication method according to an embodiment of the present invention. In the embodiment shown in FIG. 11, an example in which a relay terminal newly sets up a relay bearer based on a bearer type is used to describe the relay communication method in the present invention in detail. As shown in FIG. 11, the method includes the following steps.

S1101: A base station sends a first message to the relay terminal.

The first message may be an RRC connection reconfiguration message, and includes configuration information of a first bearer. The configuration information of the first bearer includes a first bearer identifier and a bearer type. Bearer types include a common bearer and a relay bearer described above. In an actual application, the first message includes a bearer setup modification list, and the first bearer identifier is included in the bearer setup modification list.

For detailed descriptions of the first bearer and the bearer setup modification list, refer to step S601. A detailed description is omitted herein.

S1102: The relay terminal receives the first message and obtains configuration information of a first bearer in the first message.

S1103: The relay terminal determines whether existing bearers of the relay terminal include the first bearer.

For a specific determining manner, refer to step S603. A detailed description is omitted herein.

S1104. If the existing bearers of the relay terminal do not include the first bearer, and a type of a bearer corresponding to a first bearer identifier is a relay bearer, the relay terminal sets up the first bearer, and sets up an adaptation layer logical entity for the first bearer.

If the configuration information of the first bearer further includes configuration information of the foregoing adaptation layer logical entity, for a specific implementation of setting up the adaptation layer logical entity for the first bearer, reference may be made to step S604. A detailed description is omitted herein.

S1105: The relay terminal sends a response message for the first message to the base station.

Figure 12:
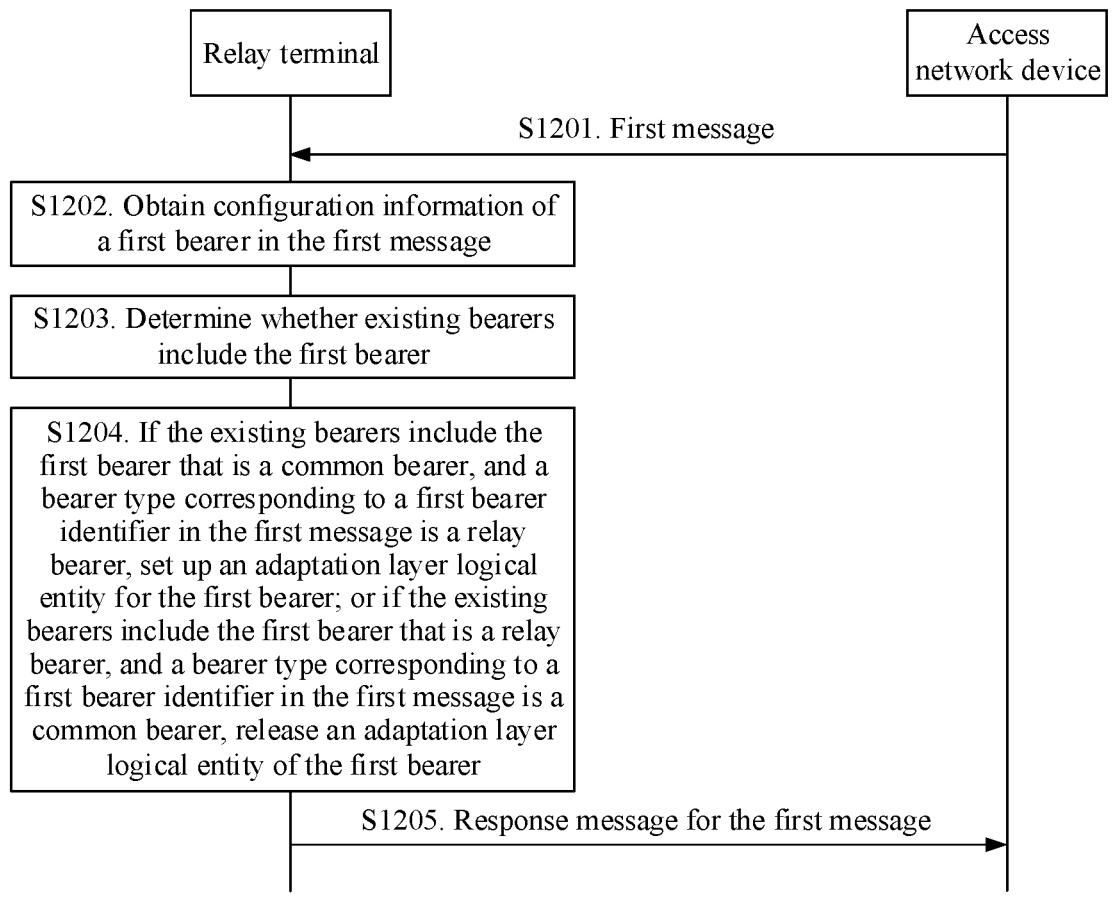
FIG. 12 is a flowchart of still another relay communication method according to an embodiment of the present invention.

FIG. 12 is a flowchart of a relay communication method according to an embodiment of the present invention. In the embodiment shown in FIG. 12, an example in which a relay terminal releases an adaptation layer logical entity of an existing relay bearer or sets up an adaptation layer logical entity for an existing relay bearer based on a bearer type is used to describe the relay communication method in the present invention in detail. As shown in FIG. 12, the method includes the following steps.

S1201: A base station sends a first message to the relay terminal.

For a description of the first message, refer to step S1101. A detailed description is omitted herein.

S1202: The relay terminal receives the first message and obtains configuration information of a first bearer in the first message.

S1203: The relay terminal determines whether existing bearers of the relay terminal include the first bearer.

For a specific determining manner, refer to step S603. A detailed description is omitted herein.

S1204. If the existing bearers of the relay terminal include the first bearer that is a common bearer, and a type of a bearer corresponding to a first bearer identifier in the first message is a relay bearer, the relay terminal sets up the adaptation layer logical entity for the first bearer; or if the existing bearers of the relay terminal include the first bearer that is a relay bearer, and a type of a bearer corresponding to a first bearer identifier in the first message is a common bearer, the relay terminal releases the adaptation layer logical entity of the first bearer.

For a manner of setting up the adaptation layer logical entity, refer to step S604. For a manner of releasing the adaptation layer logical entity of the first bearer, refer to step S904.

S1205: The relay terminal sends a response message for the first message to the base station.

It should be noted that a condition for triggering a case in which the base station sends an RRC connection reconfiguration message to the relay terminal is the same as the conditions shown in FIG. 3a to FIG. 3C. Details are not described herein again.

It should be noted that, in this embodiment of the present invention, an example in which the first message is the RRC connection reconfiguration message is used for description. The first message may also be implemented in a form of another message, such as an RRC connection setup message or another grant message sent by the base station to the relay terminal.

Figure 13A:
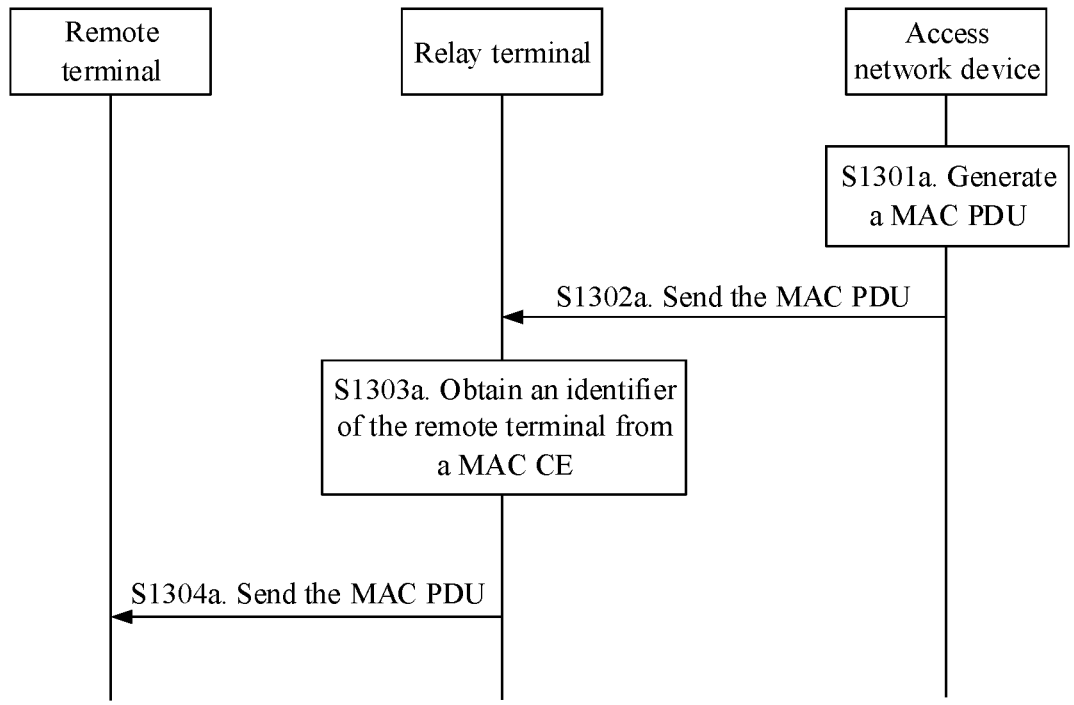
FIG. 13a is a flowchart of still another relay communication method according to an embodiment of the present invention.

FIG. 13a is a flowchart of another relay communication method according to an embodiment of the present invention. Referring to FIG. 13a, the method includes the following steps.

S1301a: An access network device generates a medium access control (MAC) protocol data unit (PDU) PDU.

The MAC PDU carries SRB0 data sent to the remote terminal. The SRB0 is a signaling radio bearer, and is generally used to transmit signaling of setting up or resetting up an RRC connection between UE and a base station. For example, an RRC connection request message sent by the UE to the base station, an RRC connection setup message returned by the base station to the UE, and the like are all transmitted by using the SRB0. The SRB0 data in this step may be the RRC connection setup message.

Figure 14:
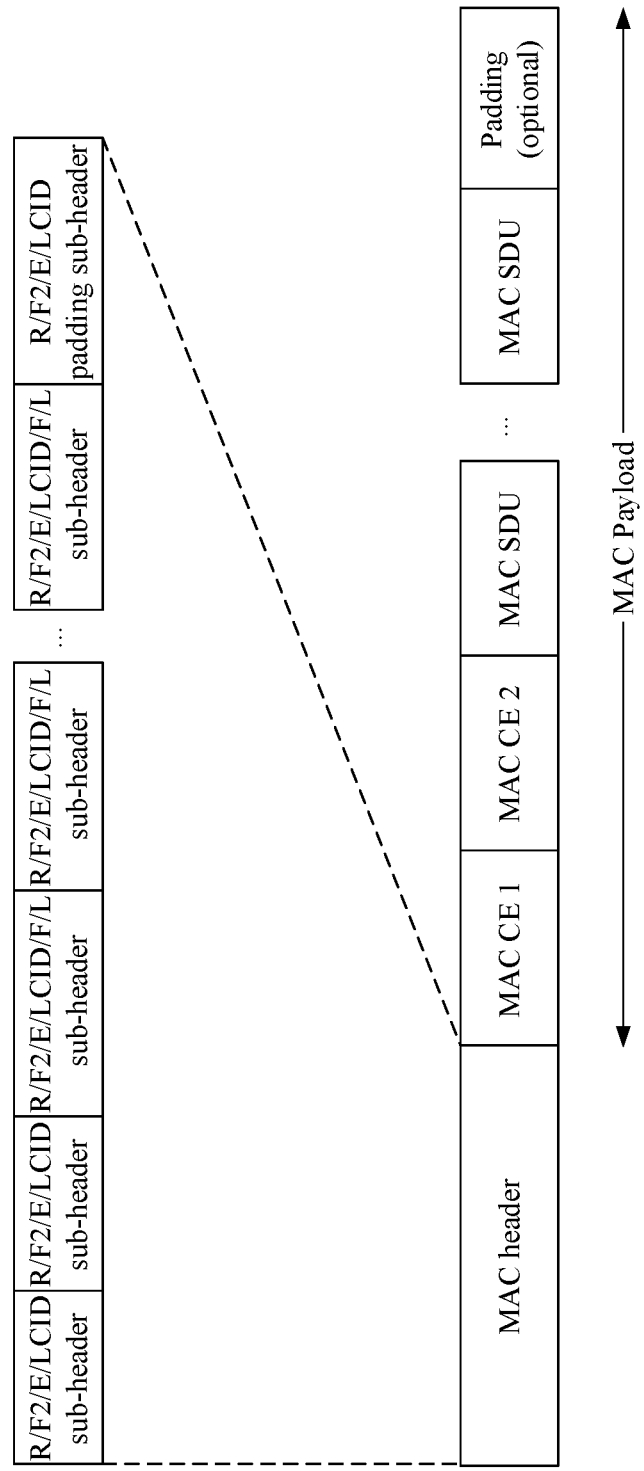
FIG. 14 is a schematic diagram of a format of a MAC PDU according to an embodiment of the present invention.

FIG. 14 is a schematic diagram of a format of a MAC PDU according to an embodiment of the present invention. Referring to FIG. 14, the MAC PDU includes a MAC control element (CE) specifically used to distinguish between data of a relay terminal and data of the remote terminal, or distinguish between data of different remote terminals. The MAC CE includes an identifier of the remote terminal or indication information. The indication information is used to indicate whether the data is the data of the relay terminal or the data of the remote terminal. The identifier of the remote terminal may be an identifier used by the base station and the relay terminal to identify the remote terminal, for example, a local ID.

S1302a: The access network device sends the MAC PDU to a relay terminal.

Specifically, the access network device learns of, based on context information that is of the relay terminal and that is stored in the access network device or context information of the remote terminal, a specific terminal used as a relay of the remote terminal, and sends the MAC PDU to a relay terminal corresponding to the remote terminal.

S1303a: The relay terminal receives the MAC PDU sent by the access network device and obtains an identifier of a remote terminal from the MAC CE.

S1304a: The relay terminal sends the MAC PDU to the remote terminal to which the identifier of the remote terminal belongs.

Figure 13B:
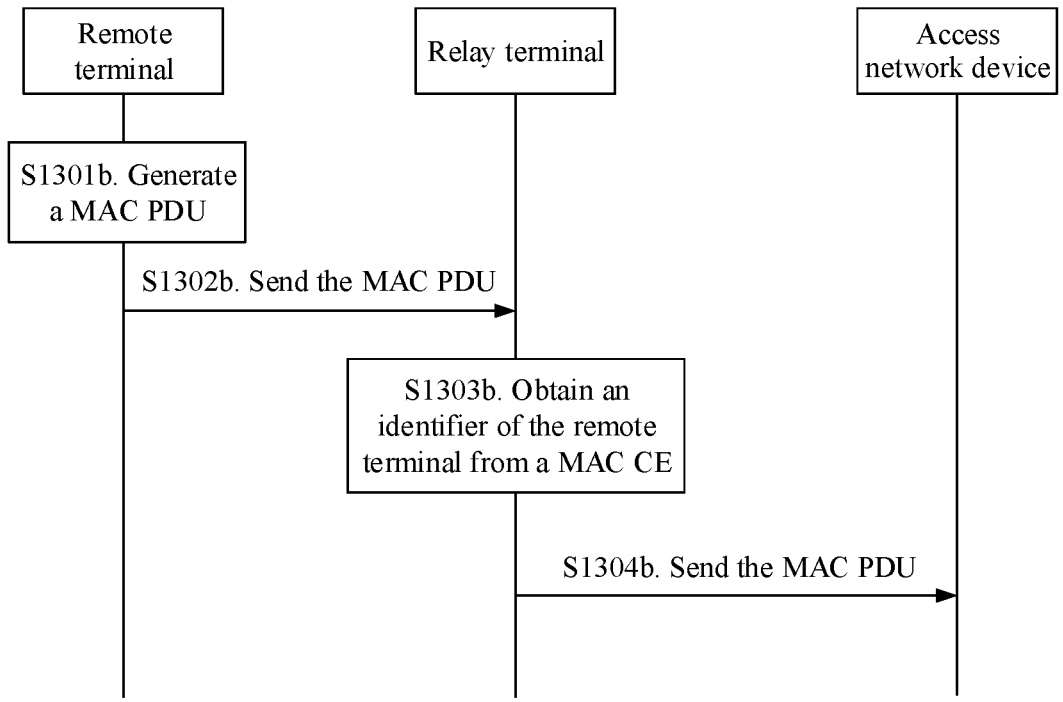
FIG. 13b is a flowchart of still another relay communication method according to an embodiment of the present invention.

FIG. 13b is a flowchart of another relay communication method according to an embodiment of the present invention. Referring to FIG. 13b, the method includes the following steps.

S1301b: A remote terminal generates a MAC PDU.

The MAC PDU carries SRB0 data sent to a base station, for example, an RRC connection request message sent to the base station.

S1302b: The remote terminal sends the MAC PDU to a relay terminal.

S1303b: The relay terminal receives the MAC PDU sent by the remote terminal and obtains an identifier of the remote terminal from a MAC CE.

S1304b: The relay terminal sends the MAC PDU to the access network device by using a relay bearer corresponding to the identifier of the remote terminal.

In the embodiments shown in FIG. 13a and FIG. 13b, because no PDCP entity and no actual RLC entity correspond to the SRB0, an adaptation function of the data of the SRB0 is implemented at a MAC layer. In other words, at the MAC layer, data of the relay terminal is distinguished from data of the remote terminal, or data of different remote terminals is distinguished from each other.

Figure 15:
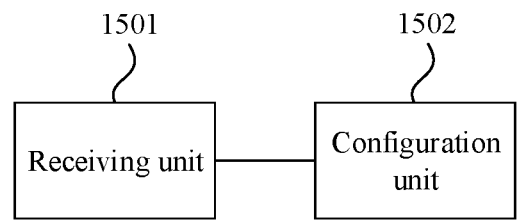
FIG. 15 is a structural block diagram of a relay communications apparatus according to an embodiment of the present invention.

FIG. 15 is a block diagram of a relay communications apparatus according to an embodiment of the present invention. The relay communications apparatus may be implemented as all or a part of a relay terminal by using a dedicated hardware circuit or a combination of software and hardware. The relay communications apparatus includes a receiving unit 1501 and a configuration unit 1502. The receiving unit 1501 is configured to receive a first message sent by an access network device. The configuration unit 1502 is configured to configure an adaptation layer logical entity for a first bearer based on the first message received by the receiving unit 1501.

Optionally, the first message may be an RRC connection reconfiguration message, an RRC connection setup message, another grant message sent by a base station to the relay terminal, or the like.

In an implementation, configuration information of the first bearer includes a first bearer identifier and adaptation function configuration information.

Further, the configuration unit 1502 is configured to: when existing bearers of the relay terminal do not include the first bearer, set up the first bearer, and set up the adaptation layer logical entity for the first bearer based on the adaptation function configuration information; or the configuration unit 1502 is configured to: when existing bearers of the relay terminal include the first bearer, configure the adaptation layer logical entity for the first bearer based on the adaptation function configuration information.

Still further, when the existing bearers of the relay terminal include the first bearer, the configuration unit 1502 is specifically configured to set up the adaptation layer logical entity for the first bearer; or reconfigure the adaptation layer logical entity of the first bearer; or release the adaptation layer logical entity of the first bearer.

In another implementation, the configuration information of the first bearer includes a first bearer identifier and bearer release indication information.

Correspondingly, the configuration unit 1502 is configured to release a resource of the first bearer, where the resource of the first bearer includes the adaptation layer logical entity.

In still another implementation, the configuration information of the first bearer includes a first bearer identifier and a bearer type. The bearer type is a relay bearer or a common bearer. The relay bearer is used to transmit data of a remote terminal or is used to transmit data of a remote terminal and data of the relay terminal, and the common bearer is used to transmit data of the relay terminal.

In this implementation, the configuration unit 1502 is configured to: when the existing bearers of the relay terminal do not include the first bearer, and the bearer type is the relay bearer, set up the first bearer based on the bearer type, and set up the adaptation layer logical entity for the first bearer; or the configuration unit 1502 is configured to: when the existing bearers of the relay terminal include the first bearer, configure the adaptation layer logical entity for the first bearer based on the bearer type.

Still further, the configuration unit 1502 is specifically configured to: when the first bearer in the existing bearers is the common bearer and the bearer type is the relay bearer, set up the adaptation layer logical entity for the first bearer; or when the first bearer in the existing bearers is the relay bearer and the bearer type is the common bearer, release the adaptation layer logical entity of the first bearer.

Optionally, the adaptation layer logical entity is an adaptation protocol entity or an adaptation function of a PDCP entity.

When the adaptation layer logical entity is the adaptation function of the PDCP entity, the adaptation function configuration information may further include indication information used to instruct the relay terminal to enable or disable the adaptation function of the PDCP entity.

For related details, refer to the method embodiments of FIG. 6 to FIG. 12.

It should be noted that the foregoing configuration unit 1502 may be implemented by a processor or by a processor executing a program instruction in a memory. The foregoing receiving unit 1501 may be implemented by a receiver Rx or by the processor in cooperation with a receiver.

Figure 16:
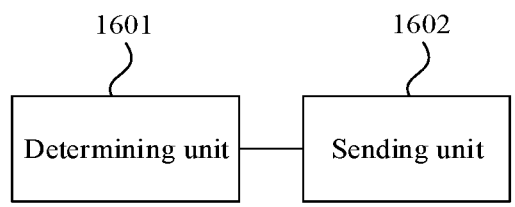
FIG. 16 is a structural block diagram of another relay communications apparatus according to an embodiment of the present invention.

FIG. 16 is a block diagram of a relay communications apparatus according to an embodiment of the present invention. The relay communications apparatus may be implemented as all or a part of an access network device by using a dedicated hardware circuit or a combination of software and hardware. The relay communications apparatus includes a determining unit 1601 and a sending unit 1602. The determining unit 1601 is configured to determine configuration information of a first bearer. The sending unit 1602 is configured to send a first message to a relay terminal, where the first message includes the configuration information of the first bearer that is determined by the determining unit 1601.

In still another implementation, the configuration information of the first bearer includes a first bearer identifier and a bearer type. The bearer type is a relay bearer or a common bearer. The relay bearer is used to transmit data of a remote terminal or is used to transmit data of a remote terminal and data of the relay terminal, and the common bearer is used to transmit data of the relay terminal. In another implementation, the configuration information of the first bearer includes a first bearer identifier and adaptation function configuration information. In another implementation, the configuration information of the first bearer includes a first bearer identifier and bearer release indication information.

Optionally, the adaptation function configuration information includes at least one of an identifier of the remote terminal and a bearer identifier of the remote terminal.

Optionally, an adaptation layer logical entity is an adaptation protocol entity or an adaptation function of a PDCP entity.

When the adaptation layer logical entity is the adaptation function of the PDCP entity, the adaptation function configuration information further includes indication information used to instruct the relay terminal to enable or disable the adaptation function of the PDCP entity.

For related details, refer to the method embodiments of FIG. 6 to FIG. 12.

It should be noted that the foregoing determining unit 1601 may be implemented by a processor or by a processor executing a program instruction in a memory. The foregoing sending unit 1602 may be implemented by a transmitter or by the processor in cooperation with a transmitter.

Figure 17:
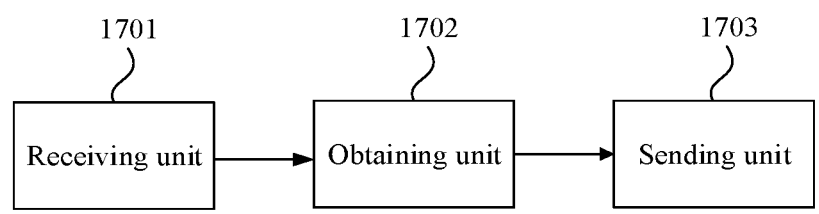
FIG. 17 is a structural block diagram of another relay communications apparatus according to an embodiment of the present invention.

FIG. 17 is a block diagram of a relay communications apparatus according to an embodiment of the present invention. The relay communications apparatus may be implemented as all or a part of a relay terminal by using a dedicated hardware circuit or a combination of software and hardware. The relay communications apparatus includes a receiving unit 1701, an obtaining unit 1702, and a sending unit 1703. The receiving unit is configured to receive a MAC PDU, where the MAC PDU includes a medium access control control element MAC CE, the MAC CE includes an identifier of a remote terminal, and the MAC PDU carries data of a signaling radio bearer SRB0 of the remote terminal. The obtaining unit 1702 is configured to obtain the identifier of the remote terminal from the MAC CE of the MAC PDU received by the receiving unit 1701. The sending unit 1703 is configured to send the MAC PDU received by the receiving unit 1701.

For related details, refer to the method embodiments of FIG. 13a, FIG. 13b, and FIG. 14.

It should be noted that the foregoing obtaining unit 1702 may be implemented by a processor or by a processor executing a program instruction in a memory; the foregoing receiving unit 1701 may be implemented by a receiver or by the processor in cooperation with a receiver; and the foregoing sending unit 1703 may be implemented by a transmitter or by the processor in cooperation with a transmitter.

Figure 18:
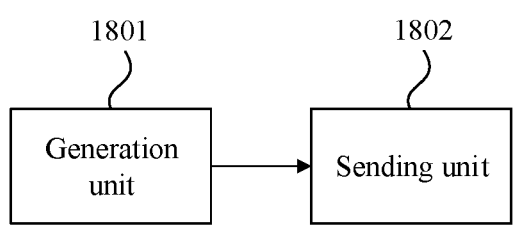
FIG. 18 is a structural block diagram of another relay communications apparatus according to an embodiment of the present invention.

FIG. 18 is a block diagram of a relay communications apparatus according to an embodiment of the present invention. The relay communications apparatus may be implemented as all or a part of an access network device or a remote terminal by using a dedicated hardware circuit or a combination of software and hardware. The relay communications apparatus includes a generation unit 1801 and a sending unit 1802. The generation unit 1801 is configured to generate a medium access control protocol data unit MAC PDU, where the MAC PDU includes a medium access control control element MAC CE, the MAC CE includes an identifier of the remote terminal, and the MAC PDU carries data of a signaling radio bearer SRB0 of the remote terminal. The sending unit 1802 is configured to send the MAC PDU generated by the generation unit 1801 to a relay terminal.

The identifier of the remote terminal may be an identifier used by the access network device and the relay terminal to identify the remote terminal, such as a local identifier.

For related details, refer to the method embodiments of FIG. 13a, FIG. 13b, and FIG. 14.

It should be noted that the foregoing generation unit 1801 may be implemented by a processor or by a processor executing a program instruction in a memory. The foregoing sending unit 1802 may be implemented by a transmitter or by the processor in cooperation with the transmitter.

Figure 19:
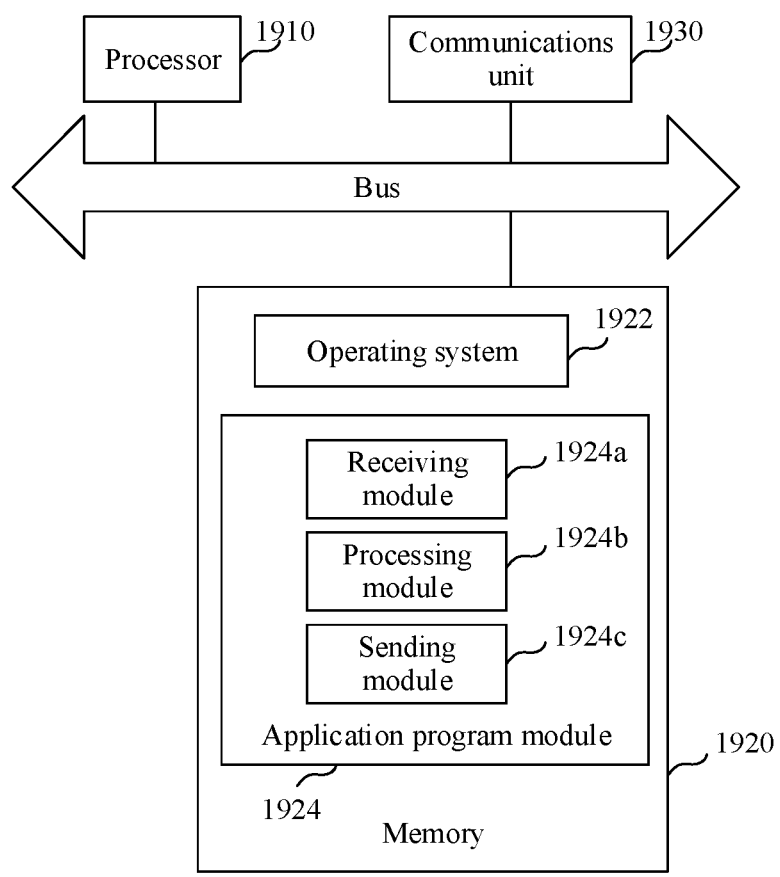
FIG. 19 is a structural diagram of a communications chip according to an embodiment of the present invention.

FIG. 19 is a schematic structural diagram of a communications chip according to an embodiment of the present invention. The communications chip is applied to a mobile communications system device such as the foregoing access network device or the foregoing terminal. The communications chip includes a processor 1910, a memory 1920, and a communications interface 1930. The processor 1910 is connected to both the memory 1920 and the communications interface 1930 by using a bus.

The communications interface 1930 is configured to implement communication with another communications device.

The processor 1910 includes one or more processing cores. The processor 1910 runs an operating system or an application program module.

Optionally, the memory 1920 may store an operating system 1922 and an application program module 1924 required by at least one function. Optionally, the application program module 1924 includes a receiving module 1924a, a processing module 1924b, and a sending module 1924c. The receiving module 1924a is configured to implement steps related to receiving. The processing module 1924b is configured to implement steps related to calculation or processing. The sending module 1924c is configured to implement steps related to sending.

In addition, the memory 1920 may be implemented by any type of volatile or non-volatile storage device or a combination thereof, such as an SRAM, an EEPROM, an EPROM, a PROM, a ROM, a magnetic memory, a flash memory, a magnetic disk, or an optical disc.

A person skilled in the art may understand that a structure shown in FIG. 19 does not constitute any limitation on the foregoing communications chip, and the communications chip may include components more or fewer than those shown in the figure, a combination of some components, or components disposed differently.

The foregoing descriptions are merely optional embodiments of the present invention, but are not intended to limit the present invention. Any modification, equivalent replacement, or improvement made without departing from the spirit and principle of the present invention should fall within the protection scope of the present invention.

The invention claimed is:

1. A relay communication method, comprising:
   receiving, a message, wherein the message includes configuration information of a bearer between a relay terminal and an access network device; and
   configuring an adaptation layer logical entity for the bearer based on the message.

2. The method according to claim 1, wherein the configuration information of the bearer includes an identifier of the bearer, an identifier of a remote terminal and a bearer identifier of the remote terminal.

3. The method according to claim 1, wherein the configuring of the adaptation layer logical entity comprises:
   in response to existing bearers not including the bearer, setting up the bearer, and setting up the adaptation layer logical entity for the bearer based on the configuration information of the bearer.

4. The method according to claim 1, wherein the adaptation layer logical entity distinguishes between data of the relay terminal and data of a remote terminal or between data of different remote terminals.

5. A relay communication method, comprising:
 determining configuration information of a bearer between an access network device and a relay terminal; and
 sending a message to the relay terminal, wherein the message includes the configuration information of the bearer.

6. The method according to claim 5, wherein the configuration information of the bearer includes an identifier of the bearer, an identifier of a remote terminal and a bearer identifier of the remote terminal.

7. The method according to claim 5, wherein the message instructs the relay terminal to configure an adaptation layer logical entity for the bearer.

8. An apparatus, comprising:
 a storage medium including executable instructions; and
 at least one processor, wherein the executable instructions, when executed by the at least one processor, cause the apparatus to:
 receive a message, wherein the message includes configuration information of a bearer between a relay terminal and an access network device; and
 configure an adaptation layer logical entity for the bearer based on the message.

9. The apparatus according to claim 8, wherein the configuration information of the bearer includes an identifier of the bearer, an identifier of a remote terminal and a bearer identifier of the remote terminal.

10. The apparatus according to claim 8, wherein the executable instructions, when executed by the at least one processor to configure the adaptation layer logical entity, cause the apparatus to:
 in response to existing bearers not including the bearer, set up the bearer, and set up the adaptation layer logical entity for the bearer based on the configuration information of the bearer.

11. The apparatus according to claim 8, wherein the adaptation layer logical entity distinguishes between data of the relay terminal and data of a remote terminal or between data of different remote terminals.

12. An apparatus, comprising:
 a storage medium including executable instructions; and
 at least one processor, wherein the executable instructions, when executed by the at least one processor, cause the apparatus to:
 determine configuration information of a bearer between an access network device and a relay terminal; and
 send a message to the relay terminal, wherein the message comprises includes the configuration information of the bearer.

13. The apparatus according to claim 12, wherein the configuration information of the bearer includes an identifier of the bearer, an identifier of a remote terminal and a bearer identifier of the remote terminal.

14. The apparatus according to claim 12, wherein the message instructs the relay terminal to configure an adaptation layer logical entity for the bearer.

15. The method according to claim 1, wherein the configuration information of the bearer indicates that the bearer is a relay bearer.

16. The method according to claim 5, wherein the configuration information of the bearer indicates that the bearer is a relay bearer.

17. The method according to claim 7, wherein the adaptation layer logical entity distinguishes between data of the relay terminal and data of a remote terminal or between data of different remote terminals.

18. The apparatus according to claim 8, wherein the configuration information of the bearer indicates that the bearer is a relay bearer.

19. The apparatus according to claim 12, wherein the configuration information of the bearer indicates that the bearer is a relay bearer.

20. The apparatus according to claim 14, wherein the adaptation layer logical entity distinguishes between data of the relay terminal and data of a remote terminal or between data of different remote terminals.

* * * * *

UNITED STATES PATENT AND TRADEMARK OFFICE
CERTIFICATE OF CORRECTION

PATENT NO. : 11,770,865 B2
APPLICATION NO. : 17/555066
DATED : September 26, 2023
INVENTOR(S) : Jing Wang, Xiao Xiao and Bo Lin It is certified that error appears in the above-identified patent and that said Letters Patent is hereby corrected as shown below:

In the Claims

Column 22, Line 53, Claim 1, please delete "receiving," and insert therefore -- receiving --;

Column 23, Line 6, Claim 5, please delete "determining" and insert therefore -- determining, --;

Column 24, Line 11 (approx.), Claim 12, please delete "comprises includes" and insert therefore -- includes --.

Signed and Sealed this
Fifteenth Day of October, 2024

Katherine Kelly Vidal
*Director of the United States Patent and Trademark Office*